US012762754B2

(12) United States Patent
Han et al.

(10) Patent No.: US 12,762,754 B2
(45) Date of Patent: Oct. 13, 2026

(54) ELECTRONIC DEVICE FOR PROVIDING INFORMATION ON VIRTUAL SPACE AND METHOD THEREOF

(71) Applicant: Samsung Electronics Co., Ltd., Suwon-si (KR)

(72) Inventors: Woojung Han, Suwon-si (KR); Gajin Song, Suwon-si (KR); Hoseon Shin, Suwon-si (KR); Dongchoon Hwang, Suwon-si (KR); Kyungtae Kim, Suwon-si (KR); Kanghee Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 224 days.

(21) Appl. No.: 18/359,287

(22) Filed: Jul. 26, 2023

(65) Prior Publication Data

US 2024/0144547 A1 May 2, 2024

Related U.S. Application Data

(63) Continuation of application No. PCT/KR2023/009670, filed on Jul. 7, 2023.

(30) Foreign Application Priority Data

Oct. 31, 2022 (KR) ........................ 10-2022-0142797

(51) Int. Cl.
*G06T 11/00* (2026.01)
*G06V 20/50* (2022.01)

(52) U.S. Cl.
CPC .............. *G06T 11/00* (2013.01); *G06V 20/50* (2022.01); *G06V 2201/10* (2022.01)

(58) Field of Classification Search
None
See application file for complete search history.

(56) References Cited

U.S. PATENT DOCUMENTS 9,959,677 B2 5/2018 Kauffmann et al.
10,034,129 B1 * 7/2018 Ellis ...................... H04W 4/021
(Continued)

FOREIGN PATENT DOCUMENTS

JP 2018-517948 7/2018
KR 100417004 B1 1/2004
(Continued)

OTHER PUBLICATIONS

Search Report and Written Opinion dated Oct. 26, 2023 issued in International Patent Application No. PCT/KR2023/009670.

*Primary Examiner* — David H Chu
(74) *Attorney, Agent, or Firm* — Nixon & Vanderhye, P.C.

(57) ABSTRACT

A processor is configured to identify a specified event based on data output from one or more sensors. The processor is configured to, in response to identifying occurrence of the specified event, transmit, to an external electronic device connected via a communication circuit, a first signal requesting information associated with both the specified event and a virtual space provided by the external electronic device. The processor is configured to provide, by controlling the display based on receiving a second signal corresponding to the first signal from the external electronic device, information included in the second signal in a state that is executable by a second application different from the first application for displaying the virtual space.

19 Claims, 13 Drawing Sheets

(56) References Cited

U.S. PATENT DOCUMENTS

| | | | | |
|---|---|---|---|---|
| 10,169,924 | B2 | 1/2019 | Rosenthal et al. | |
| 10,289,376 | B2 | 5/2019 | Baek et al. | |
| 10,430,207 | B2 | 10/2019 | Wang | |
| 10,620,720 | B2 | 4/2020 | Karlsson et al. | |
| 10,679,411 | B2 | 6/2020 | Ziman | |
| 10,949,669 | B2 | 3/2021 | Lerman | |
| 11,481,965 | B2 | 10/2022 | Ahn et al. | |
| 11,556,169 | B2 | 1/2023 | Wallen et al. | |
| 11,567,627 | B2 * | 1/2023 | Day | G06F 3/0485 |
| 2011/0113382 | A1 * | 5/2011 | Cannon | G06N 3/006<br>715/848 |
| 2011/0225069 | A1 * | 9/2011 | Cramer | G06Q 30/06<br>705/26.1 |
| 2013/0254642 | A1 * | 9/2013 | Seo | G06F 16/955<br>715/205 |
| 2013/0314398 | A1 * | 11/2013 | Coates | H04W 4/029<br>345/419 |
| 2014/0101295 | A1 * | 4/2014 | Dayan | G06F 9/455<br>709/219 |
| 2014/0236775 | A1 | 8/2014 | Gill et al. | |
| 2015/0234468 | A1 * | 8/2015 | Hwang | G06F 3/0486<br>345/156 |
| 2017/0131964 | A1 * | 5/2017 | Baek | G06F 3/1423 |
| 2017/0150139 | A1 * | 5/2017 | Lee | H04N 13/344 |
| 2018/0114250 | A1 * | 4/2018 | Phillips | A63F 13/212 |
| 2018/0218525 | A1 * | 8/2018 | Jagerson, Jr. | G06V 20/17 |
| 2018/0288564 | A1 * | 10/2018 | Ellis | H04W 4/021 |
| 2018/0349699 | A1 * | 12/2018 | O'Connell | G06V 20/20 |
| 2018/0349703 | A1 * | 12/2018 | Rathod | A63F 13/65 |
| 2019/0180483 | A1 * | 6/2019 | DeLuca | G02B 27/017 |
| 2020/0051337 | A1 * | 2/2020 | Reynolds | G06T 11/60 |
| 2020/0258144 | A1 * | 8/2020 | Chaturvedi | G06Q 30/0633 |
| 2020/0258481 | A1 * | 8/2020 | Woo | G06T 11/00 |
| 2020/0320794 | A1 * | 10/2020 | Huang | G06F 16/9577 |
| 2021/0183135 | A1 * | 6/2021 | Lin | G06T 15/04 |
| 2021/0228988 | A1 * | 7/2021 | Franceus | A63F 13/35 |
| 2021/0264669 | A1 * | 8/2021 | Shreve | G06T 7/70 |
| 2022/0065651 | A1 * | 3/2022 | Beaurepaire | G06T 11/60 |
| 2022/0114798 | A1 * | 4/2022 | Gordon | G06Q 20/3223 |
| 2022/0255995 | A1 * | 8/2022 | Berliner | G06T 19/20 |
| 2023/0005193 | A1 | 1/2023 | Choi | |
| 2023/0196057 | A1 * | 6/2023 | Cho | A63F 13/655<br>345/473 |
| 2023/0419737 | A1 * | 12/2023 | Bruveris | G06V 20/64 |
| 2024/0022599 | A1 * | 1/2024 | Merdassa | H04L 63/1433 |
| 2024/0157142 | A1 * | 5/2024 | Yeniel | G16H 20/30 |
| 2025/0178436 | A1 * | 6/2025 | Feng | B60K 35/23 |
| 2025/0200880 | A1 * | 6/2025 | Wang | G06T 7/11 |

FOREIGN PATENT DOCUMENTS

| | | | |
|---|---|---|---|
| KR | 100836481 | B1 | 6/2008 |
| KR | 20130082692 | A | 7/2013 |
| KR | 10-2017-0053280 | | 5/2017 |
| KR | 10-2017-0060485 | | 6/2017 |
| KR | 102024863 | B1 | 9/2019 |
| KR | 10-2021-0114287 | | 9/2021 |
| KR | 10-2021-0127054 | | 10/2021 |

* cited by examiner

ELECTRONIC DEVICE FOR PROVIDING INFORMATION ON VIRTUAL SPACE AND METHOD THEREOF

CROSS-REFERENCE TO RELATED APPLICATIONS

This application is a continuation of International Application No. PCT/KR2023/009670 designating the United States, filed on Jul. 7, 2023, in the Korean Intellectual Property Receiving Office and claiming priority to Korean Patent Application No. 10-2022-0142797, filed on Oct. 31, 2022, in the Korean Intellectual Property Office, the disclosures of each of which are incorporated by reference herein in their entireties.

BACKGROUND

Field

The present disclosure relates to an electronic device for providing information on a virtual space and a method thereof.

Description of Related Art

With development of communication technology, types of information transmitted through networks are diversified. A service for supporting exchange of information between physically separated users using a network may be provided through electronic devices owned by each of the users and other electronic devices (e.g., server) connected to each of the electronic devices.

SUMMARY

According to an example embodiment, an electronic device may comprise: communication circuitry, one or more sensors, a display, and a processor. The processor may be configured to identify a specified event based on data output from the one or more sensors. The processor may be configured to, in response to identifying occurrence of the specified event, transmit, to an external electronic device connected via the communication circuitry, a first signal for requesting information associated with both the specified event and a virtual space provided by the external electronic device. The processor may be configured to provide, by controlling the display based on receiving a second signal corresponding to the first signal from the external electronic device, information included in the second signal in a state that is executable by a second application different from the first application for displaying the virtual space.

According to an example embodiment, a method of an electronic device may comprise: identifying a specified event based on data output from one or more sensors in the electronic device. The method may comprise, in response to identifying occurrence of the specified event, transmitting, to an external electronic device connected via a communication circuitry in the electronic device, a first signal for requesting information associated with both the specified event and a virtual space provided by the external electronic device. The method may comprise providing, by controlling a display in the electronic device based on receiving a second signal corresponding to the first signal from the external electronic device, information included in the second signal in a state that is executable by a second application different from the first application for displaying the virtual space.

According to an example embodiment, an electronic device may comprise: a communication circuit and a processor. The processor may be configured to receive, from an external electronic device via the communication circuit in the electronic device, a first signal for requesting information associated with virtual space provided by the electronic device. The processor may be configured to obtain, based on a specified event identified by the external electronic device and indicated by the first signal, information associated with both the virtual space and the specified event. The processor may be configured to transmit, via the communication circuit, to the external electronic device, a second signal for providing the obtained information using a second application different from the first application associated with the virtual space.

According to an example embodiment, a method of an electronic device may comprise receiving, from an external electronic device via a communication circuit in the electronic device, a first signal for requesting information associated with virtual space provided by the electronic device. The method may comprise obtaining, based on a specified event identified by the external electronic device and indicated by the first signal, information associated with both the virtual space and the specified event. The method may comprise transmitting, to the external electronic device, a second signal for providing the obtained information using a second application different from the first application associated with the virtual space.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
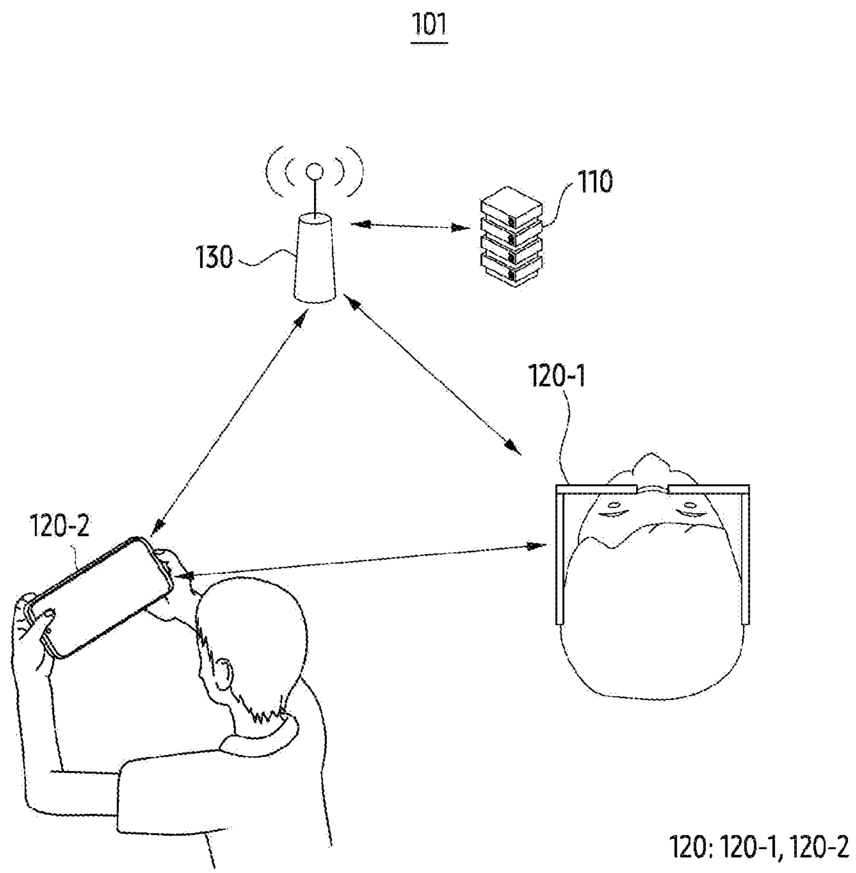
FIG. 1 is a diagram illustrating an example environment in which a metaverse service is provided through a server, according to an embodiment.

Hereinafter, various example embodiments of the present disclosure will be described in greater detail with reference to the accompanying drawings.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as “A or B,” “at least one of A and B,” “at least one of A or B,” “A, B, or C,” “at least one of A, B, and C,” and “at least one of A, B, or C,” may include any one of, or all possible combinations of the items enumerated together in a corresponding one of the phrases. As used herein, such terms as “1st” and “2nd,” or “first” and “second” may be used to simply distinguish a corresponding component from another, and does not limit the components in other aspect (e.g., importance or order). It is to be understood that if an element (e.g., a first element) is referred to, with or without the term “operatively” or “communicatively”, as “coupled with,” “coupled to,” “connected with,” or “connected to” another element (e.g., a second element), the element may be coupled with the other element directly (e.g., wiredly), wirelessly, or via a third element.

As used in connection with various embodiments of the disclosure, the term “module” may include a unit implemented in hardware, software, or firmware, or any combination thereof, and may interchangeably be used with other terms, for example, “logic,” “logic block,” “part,” or “circuitry”. A module may be a single integral component, or a minimum unit or part thereof, adapted to perform one or more functions. For example, according to an embodiment, the module may be implemented in a form of an application-specific integrated circuit (ASIC).

Metaverse may refer, for example, to a combination of the English words Meta, which means “virtual” and “transcendence,” and “Universe,” which may refer, for example, to the universe, and refers to a three-dimensional virtual world where social, economic, and cultural activities like the real world take place. Metaverse is a concept that has evolved one step further than virtual reality, and it is characterized, for example, using avatars to not only enjoy games or virtual reality (VR, cutting-edge technology that enables people to experience real-life experiences in a computerized virtual world), but also social and cultural activities like real reality.

Such a metaverse service may be provided in at least two forms. A first form is to provide services to users using a server, and a second form is to provide services through individual contacts between users.

FIG. 1 is a diagram illustrating an example environment 101 in which a metaverse service is provided through a server 110.

Referring to FIG. 1, environment 101 includes a server 110 providing a metaverse service, a network (e.g., a network formed by at least one intermediate node 130 including an access point (AP) and/or a base station) connecting the server 110 and each of the user terminal (e.g., a user terminal 120 including a first terminal 120-1 and a second terminal 120-2), a user terminal that enable the use of services by accessing the server through the network and providing input and output to the metaverse service to the user.

In this case, the server 110 provides a virtual space so that the user terminal 120 may perform an activity in the virtual space. In addition, the user terminal 120 may install an S/W agent for accessing the virtual space provided by the server 110 to represent the information provided by the server 110 to the user or transmits the information that the user wants to represent in the virtual space to the server.

The S/W agent may, for example, be directly provided through the server 110 or downloaded from a public server, or may be embedded when purchasing a terminal.

Figure 2:
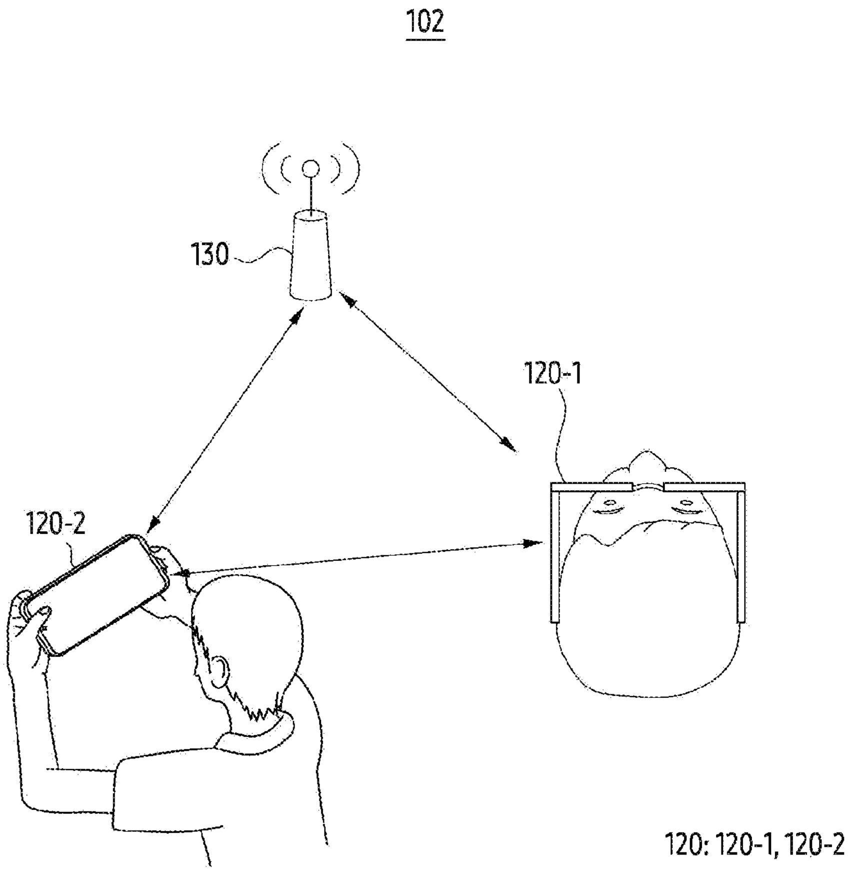
FIG. 2 is a diagram illustrating an example environment in which a metaverse service is provided through a direct connection between user terminals and a second terminal, according to an embodiment.

FIG. 2 is a diagram illustrating an example environment 102 in which a metaverse service is provided through direct connection between user terminals and a second terminal (e.g., a first terminal 120-1 and a second terminal 120-2).

Referring to FIG. 2, the environment 102 may include a first terminal 120-1 providing a metaverse service, a network connecting each user terminal (e.g., a network formed by at least one intermediate node 130), and a second terminal 120-2 that allows a second user to use the service by inputting/outputting to the metaverse service by connecting to the first terminal 120-1 through the network.

The example illustrated in FIG. 2 is characterized in that the first terminal 120-1 provides a metaverse service by performing the role of a server (e.g., the server 110 of FIG. 1) in the first embodiment. For example, it may be seen that the metaverse environment may be configured only by connecting the device to the device.

In the examples illustrated in FIGS. 1 and 2, the user terminal 120 (or the user terminal 120 including the first terminal 120-1 and the second terminal 120-2) may be made of various form factors, and may include an output device that provides an image or/and sound to a user and an input device for inputting information into a metaverse service. Examples of various form factors of the user terminal 120 may include, for example, and without limitation, a smartphone (e.g., the second terminal 120-2), an AR device (e.g., the first terminal 120-1), a VR device, an MR device, a VST device, or TV or projector capable of input/output, and the like.

The network of the present disclosure (e.g., a network formed by at least one intermediate node 130) may include all of various broadband networks including 3G, 4G, and 5G and a short-range network (e.g., a wired network or wireless network directly connecting the first terminal 120-1 and the second terminal 120-2) including Wi-Fi, BT, and the like.

Figure 3:
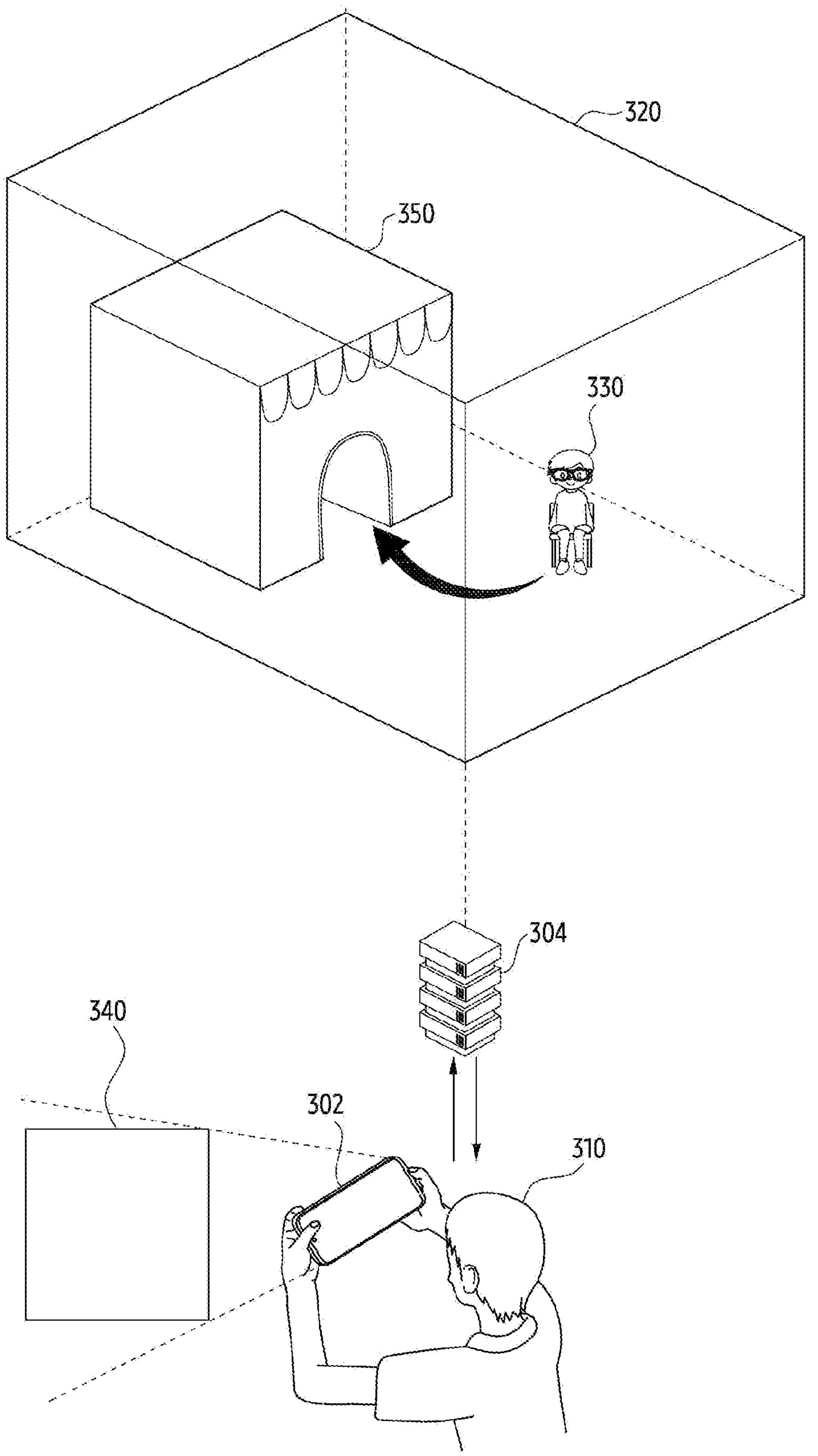
FIG. 3 is a diagram illustrating an example of an operation in which an electronic device obtains information associated with an event in a virtual space based on the event identified by the electronic device, according to an embodiment.

FIG. 3 is a diagram illustrating an example of an operation in which an electronic device 302 obtains information associated with an event in a virtual space 320 based on the event identified by the electronic device 302, according to an embodiment. FIG. 3 is a diagram illustrating a plurality of electronic devices connected to each other based on a network. Referring to FIG. 3, an example situation in which an electronic device 302 and an external electronic device 304 are connected to each other based on a wired network and/or a wireless network is illustrated. Hardware components included in the electronic device 302 and the external electronic device 304 will be described in greater detail below with reference to FIG. 4. The electronic device 304 may be referred to as the external electronic device 304. However, embodiments are not limited thereto. For example, when the external electronic device 304 is referred to as the electronic device 304, the electronic device 302 may be referred to as the external electronic device 302. The wired network may include a network such as, for example, and without limitation, the Internet, a local area network (LAN), a wide area network (WAN), Ethernet, or a combination thereof. The wireless network may include, for example, and without limitation, a network such as a long term evolution (LTE), a 5g new radio (NR), a wireless fidelity (Wi-Fi), Zigbee, a near field communication (NFC), Bluetooth, Bluetooth low energy (BLE), or a combination thereof. Although the electronic device 302 and the external electronic device 304 are illustrated as being directly connected, the electronic device 302 and the external electronic device 304 may be indirectly connected through an intermediate node (e.g., the intermediate node 130 of FIGS. 1 to 2).

Referring to FIG. 3, the electronic device 302 may be a terminal. For example, the terminal may include a personal computers (PC) such as, for example, and without limitation, a laptop and a desktop, a smartphone, a smart pad, and/or a tablet PC. The terminal may include smart accessories such as a smartwatch and/or a head-mounted device (HMD). In terms of the owner, the electronic device 302 may be referred to as a user terminal. The electronic device 302 of FIG. 3 may include the user terminal 120 of FIGS. 1 to 2. The user 310 of the electronic device 302 may be a subscriber of a service provided by the external electronic device 304.

Referring to FIG. 3, the external electronic device 304 may include a server of a service provider. The server may include one or more PCs and/or workstations. The external electronic device 304 may include a server providing a metaverse service, for example, the server 110 of FIG. 1. The external electronic device 304 may execute at least one function to enhance interconnectivity between physically separated users, based on the metaverse service. For example, the external electronic device 304 may enhance interconnectivity of users (e.g., the user 310) of the terminals, using a virtual space 320 accessible by different terminals connected to the external electronic device 304. Information for displaying the virtual space 320 including one or more virtual objects may be stored in the external electronic device 304, based on 3D coordinate system.

According to an embodiment, the electronic device 302 may execute a function for accessing the virtual space 320 provided by the external electronic device 304. The electronic device 302 may identify an input indicating to access the virtual space 320 from the user 310. In response to the input, the electronic device 302 may obtain information associated with at least a portion of the virtual space 320 from the external electronic device 304. An avatar 330, which may include a virtual object corresponding to the user 310 of the electronic device 302, may be displayed in the virtual space 320. At least one of the shape, size, and/or position of the virtual space 320 may be set by user information (e.g., account information) stored in the external electronic device 304 and corresponding to the user 310. The external electronic device 304 may transmit information for displaying a portion of the virtual space 320 in which the avatar 330 is disposed to the electronic device 302. The electronic device 302 may transmit information for controlling the avatar 330 to the external electronic device 304. The external electronic device 304 may modify the shape, size, and/or position of the avatar 330 in the virtual space 320, based on the information transmitted from the external electronic device 304. The external electronic device 304 may monitor and/or store an action of the avatar 330 performed in the virtual space 320. An example operation in which the action of the avatar 330 in the virtual space 320 is monitored and/or stored is described in greater detail below with reference to FIG. 5.

According to an embodiment, the electronic device 302 may provide the user 310 with a borderless user experience of the virtual space 320 and real space, by linking a first action of the user 310 corresponding to the avatar 330 with a second action of the avatar 330 performed in the virtual space 320. For example, when the avatar 330 is moved to a portion of the virtual space 320 linked to a place geographically specified in the real space, based on the first action, the electronic device 302 may execute a function associated with the portion based on whether a position of the electronic device 302 moved by the user 310 is included in the place. Referring to FIG. 3, the portion of the virtual space 320 linked to the geographically specified place in the real space may include a virtual object linked to a store in the real space, such as a store 350. When the avatar 330 in the virtual space 320 is moved to the store 350 as controlled by the electronic device 302, the external electronic device 304 may store an action of the avatar 330 with respect to the store 350. The external electronic device 304 may transmit information associated with the stored action of the avatar 330 to the electronic device 302, based on identifying that the electronic device 302 enters the store in the real space linked to the store 350. Based on the information, the electronic device 302 may display a user interface (UI) associated with the store 350 in the virtual space 320 linked to the store in the real space. According to an embodiment, an example of an operation performed by the electronic device 302 based on whether a portion (e.g., the store 350) of the virtual space 320 is linked to a position of the electronic device 302 will be described in greater detail below with reference to FIGS. 6 to 7.

According to an embodiment, the electronic device 302 may store multimedia content 340 (e.g., image and/or video) obtained by controlling a camera and multimedia content generated based on the virtual space 320 by linking. For example, the electronic device 302 may search for a plurality of multimedia content generated based on virtual space 320 and corresponding to the multimedia content 340, based on metadata corresponding to the multimedia content 340. The metadata may include information indicating at least one of a position in which the multimedia content 340 is obtained or one or more users included in the multimedia content 340. For example, the electronic device 302 that identifies other multimedia content generated based on a portion of the virtual space 320 linked to a position at which the multimedia content 340 is obtained may store the multimedia content 340 and the other multimedia content by linking. An example operation in which the electronic device 302 stores the multimedia content 340 and the other multimedia content by linking will be described in greater detail below with reference to FIGS. 8 and 9.

According to an embodiment, the electronic device 302 may receive information representing an action of the avatar

330 performed in the virtual space 320 provided by the external electronic device 304, from the external electronic device 304. The electronic device 302 may display at least one multimedia content based on the received information, using a second application different from a first application for displaying the virtual space 320. The second application may include an application for browsing one or more multimedia contents stored in the electronic device 302, such as a gallery application. An example of the multimedia content in which the electronic device 302 displays through the second application based on the information received from the external electronic device 304 will be described in greater detail below with reference to FIG. 10.

As described above, according to an embodiment, the electronic device 302 may display information associated with the virtual space 320 to the user 310, based on occurrence of a preset (e.g., specified) event for displaying and/or obtaining the information. The preset event may occur by an action of the user 310 detected by the electronic device 302. The preset event may occur by at least one of whether the electronic device 302 is moved to a place in the real space linked to at least a portion (e.g., store 350) of the virtual space 320 and/or obtains multimedia content based on the virtual space 320. Since information associated with the virtual space 320 is displayed to the user 310 based on occurrence of the preset event identified by the electronic device 302, the electronic device 302 may provide a user experience linked to the virtual space 320.

Hereinafter, referring to FIG. 4, an example of a structure of the electronic device 302 and the external electronic device 304 for providing a user experience based on a virtual space 320 will be described.

Figure 4:
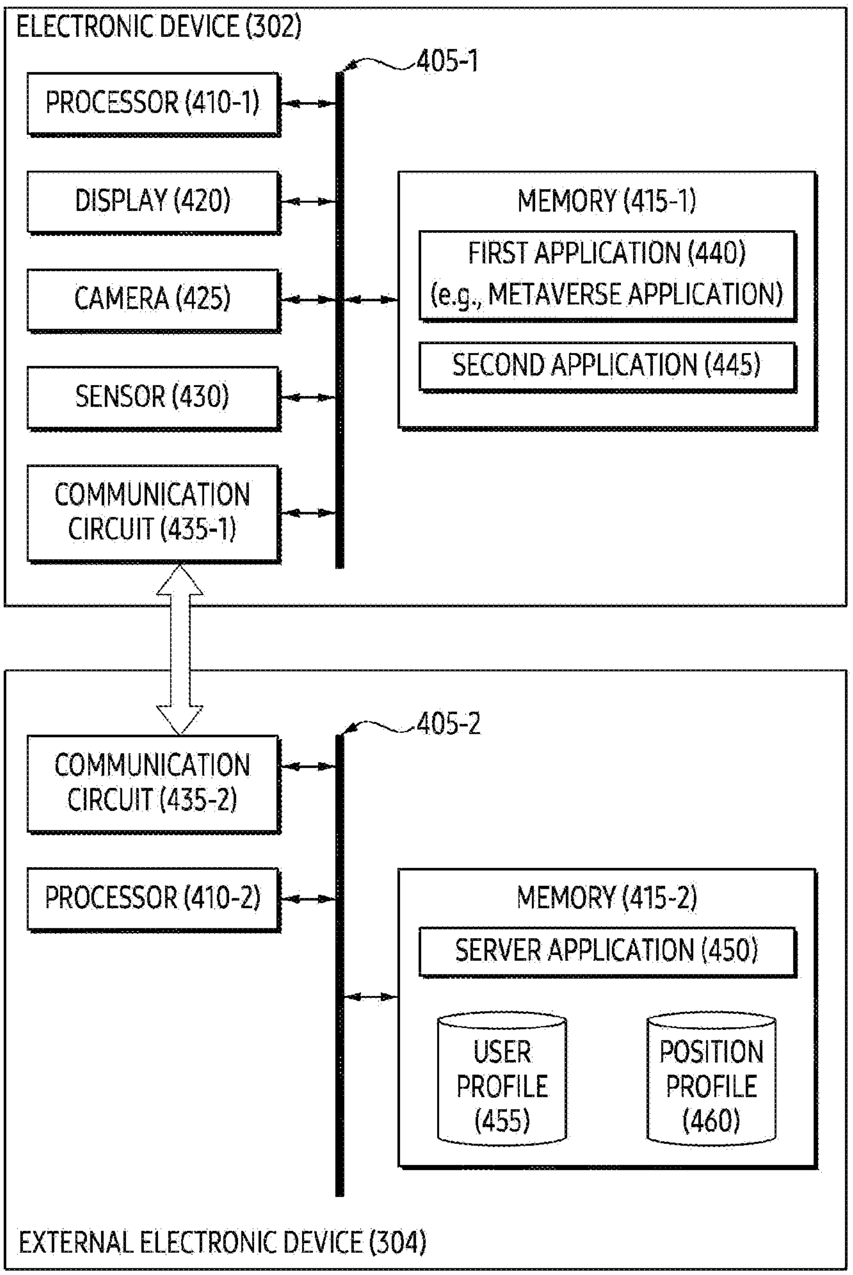
FIG. 4 is a block diagram illustrating an example configuration of an electronic device and an external electronic device, according to an embodiment.

FIG. 4 is a block diagram illustrating an example configuration of an electronic device 302 and an external electronic device 304, according to an embodiment. The electronic device 302 of FIG. 4 may include the electronic device 302 of FIG. 3 and the user terminal 120 of FIGS. 1 to 2. The external electronic device 304 of FIG. 4 may include the external electronic device 304 of FIG. 3 and the server 110 of FIGS. 1 to 2.

Referring to FIG. 4, the electronic device 302 may include at least one of a processor (e.g., including processing circuitry) 410-1, a memory 415-1, a display 420, a camera 425, a sensor 430, and/or a communication circuit 435-1. The processor 410-1, the memory 415-1, the display 420, the camera 425, the sensor 430, and the communication circuit 435-1 may be electronically and/or operably coupled with each other by electronical component such as a communication bus 405-1. Hereinafter, the operational coupling of hardware may refer, for example, to a direct or indirect connection between hardware established by wire or wirelessly, so that a second hardware is controlled by a first hardware among the hardware. Although illustrated based on different blocks, embodiments are not limited thereto, and a portion of the hardware of FIG. 4 (e.g., at least a portion of the processor 410-1, the memory 415-1, and the communication circuit 435-1) may be included in a single integrated circuit such as a system on a chip (SoC). The type and/or number of hardware included in the electronic device 302 is not limited to an embodiment of FIG. 4. For example, the electronic device 302 may include only a portion of the hardware illustrated in FIG. 4, or may further include hardware not illustrated in FIG. 4.

According to an embodiment, the processor 410-1 in the electronic device 302 may include a hardware component for processing data based on one or more instructions. Hardware components for processing data may include, for example, an arithmetical and logical unit (ALU), a floating point unit (FPU), a field programmable gate array (FPGA), a central processing unit (CPU), and/or an application processor (AP). The number of processors 410-1 may be one or more. For example, the processor 410-1 may have a structure of a multi-core processor such as a dual core, a quad core, or a hexa core.

According to an embodiment, the memory 415-1 in the electronic device 302 may include hardware for storing data and/or instructions input and/or output to the processor 410-1. For example, the memory 415-1 may include a volatile memory such as random-access memory (RAM) and/or a non-volatile memory such as a read-only memory (ROM). For example, the volatile memory may include at least one of a dynamic RAM (DRAM), a static RAM (SRAM), a cache RAM, and a pseudo SRAM (PSRAM). For example, the non-volatile memory may include at least one of a programmable ROM (PROM), an erasable PROM (EPROM), an electrically erasable PROM (EEPROM), a flash memory, a hard disk, a compact disk, a solid state drive (SSD), and an embedded multimedia card (eMMC).

According to an embodiment, the display 420 in the electronic device 302 may output visualized information (e.g., at least one of screens of FIGS. 7, 9, and/or 10) to the user. For example, the display 420 may be controlled by a controller such as the processor 410-1 and/or a graphic processing unit (GPU) to output visualized information to the user. The display 420 may include a flat panel display (FPD) and/or an electronic paper. The FPD may include a liquid crystal display (LCD), a plasma display panel (PDP), and/or one or more light emitting diode (LED). The LED may include an organic LED (OLED).

According to an embodiment, the display 420 in the electronic device 302 may include a sensor (e.g., a touch sensor panel (TSP)) for detecting an external object (e.g., a user's finger) on the display 420. For example, based on the TSP, the electronic device 302 may detect an external object contacting with the display 420 or floating on the display 420. In response to detecting the external object, the electronic device 302 may execute a function associated with a specific visual object corresponding to a position on the display 420 in which the external object is detected, among visual objects displayed in the display 420.

According to an embodiment, the camera 425 in the electronic device 302 may include one or more light sensors (e.g., a charged coupled device (CCD) sensor, a complementary metal oxide semiconductor (CMOS) sensor) generating an electrical signal indicating the color and/or brightness of light. A plurality of light sensors in the camera 425 may be disposed in a form of a two-dimensional array. The camera 425 may generate a two-dimensional frame corresponding to the light reaching the light sensors in the two-dimensional array, by substantially simultaneously obtaining electrical signals of each of the plurality of light sensors. For example, data on photo captured using the camera 425 may refer, for example, to one two-dimensional frame obtained from the camera 425. For example, data on video captured using the camera 425 may refer to a sequence of a plurality of two-dimensional frames obtained from the camera 425. The sequence may include frames periodically obtained according to a preset frame rate. The multimedia content 340 of FIG. 3 may include the example photo data and/or video data. The camera 425 may further include a flashlight disposed in a direction of receiving light and outputting light in the direction. In terms of detecting light, the camera 425 may be referred to as an image sensor or may be included as a portion of the sensor 430.

According to an embodiment, the sensor 430 in the electronic device 302 may generate electronic information that can be processed by the processor 410-1 and/or the memory 415-1 of the electronic device 302, from non-electronic information associated with the electronic device 302. For example, the sensor 430 may include a global positioning system (GPS) sensor to detect a geographic location of the electronic device 302. For example, in addition to the GPS method, the sensor 430 may generate information indicating the geographical location of the electronic device 302 based on a global navigation satellite system (GNSS) such as Galileo and Beidou (compass). The information may be stored in the memory 415-1 in the electronic device 302, processed by the processor 410-1 in the electronic device 302, or transmitted to external electronic device 304 through the communication circuit 435-1 in the electronic device 302. The type and/or number of the sensors 430 included in the electronic device 302 are not limited to those described above. For example, the sensor 430 may include an image sensor, an illumination sensor, a time-of-flight (ToF) sensor, and/or an inertia measurement unit (IMU) for detecting electromagnetic waves light including light.

In an embodiment, the IMU included in the sensor 430 may include an acceleration sensor, a gyro sensor, a geomagnetic sensor, or a combination thereof. The acceleration sensor may output data indicating a direction and/or size of gravity acceleration applied to the acceleration sensor along a plurality of axes perpendicular to each other (e.g., x-axis, y-axis, and z-axis). The gyro sensor may output data indicating rotation of each of the plurality of axes. The geomagnetic sensor may output data indicating a direction (e.g., a direction of N pole or S pole) of a magnetic field included in the geomagnetic sensor. In terms of detecting motion of the electronic device 302, the IMU in the sensor 430 may be referred to as a motion sensor.

According to an embodiment, the communication circuit 435-1 in the electronic device 302 may include hardware to support a transmission and/or reception of an electrical signal between the electronic device 302 and the external electronic device 304. Although only the external electronic device 304 is illustrated as another electronic device connected to the electronic device 302 through the communication circuit 435-1, the embodiments are not limited thereto. For example, the communication circuit 435-1 may include at least one of a MODEM, an antenna, and an optic/electronic (O/E) converter. The communication circuit 435-1 may support transmission and/or reception of an electrical signal, based on various types of protocols, such as Ethernet, a local area network (LAN), a wide area network (WAN), a wireless fidelity (Wi-Fi), Bluetooth, Bluetooth low energy (BLE), ZigBee, a long term evolution (LTE), 5G new radio (NR).

Although not illustrated, the electronic device 302 according to an embodiment may include various circuitry and/or components for outputting information in a form other than a visualized form. For example, the electronic device 302 may include a speaker for outputting an acoustic signal. For example, the electronic device 302 may include a motor for providing haptic feedback based on vibration.

Referring to FIG. 4, according to an embodiment, the external electronic device 304 may include a processor (e.g., including processing circuitry) 410-2, a memory 415-2, and a communication circuit 435-2, which are electronically and/or operably connected to each other by electronic components such as the communication bus 405-2. Hardware (e.g., the processors 410-1 and 410-2, the memory 415-1 and 415-2 and/or the communication circuit 435-1 and 435-2) performing similar functions in the electronic device 302 and the external electronic device 304 may be illustrated based on matched reference numbers. A description of the hardware included in each of the electronic device 302 and the external electronic device 304 may not be repeated to reduce the repetition of the description.

According to an embodiment, one or more instructions (or commands) indicating an operation and/or calculation to be performed on data by the processor 410-1 of the electronic device 302 may be stored in the memory 415-1 of the electronic device 302. The set of one or more instructions may be referred to as a firmware, an operating system, a process, a routine, a sub-routine, and/or an application. For example, when a set of a plurality of instructions distributed in a form of the operating system, firmware, driver, and/or application is executed, the electronic device 302 and/or the processor 410-1 of the electronic device 302 may perform at least one of operations of FIGS. 11 to 13. Similarly, when a set of a plurality of instructions is executed, the external electronic device 304 and/or the processors 410-1 and 410-2 of the external electronic device 304 may perform the operation of FIG. 11. Hereinafter, that an application is installed in the electronic device (e.g., the electronic device 302 and/or the external electronic device 304) indicates that one or more instructions provided in the form of the application are stored in the memory of the electronic device, and may refer, for example, to the one or more applications being stored in a format (e.g., a file with an extension specified by operating system) executable by the processor of the electronic device.

Referring to FIG. 4, an example of information (e.g., a user profile 455 and/or a position profile 460) and applications (e.g., a first application 440, a second application 445, and/or a server application 450) stored in the memory 415-1 of the electronic device 302 and the memory 415-2 of the external electronic device 304 are illustrated. The external electronic device 304 and/or the processors 410-1 and 410-2 of the external electronic device 304 may execute a function associated with a virtual space (e.g., the virtual space 320 of FIG. 3), based on execution of the server application 450. In a state that the server application 450 is executed, the external electronic device 304 may store information for providing the virtual space in the memory 415-2, based on the user profile 455 and/or the position profile 460, which may include a database (DB) stored in the memory 415-2. The DB may include at least one of a set of systematized information for forming a virtual space and/or an application (e.g., a database management application (not shown) different from the server application 450) executed to manage the information. In the set of information, different information may be combined with each other, based on units such as a type, a field, a column, a record, and/or a table. A combination of information may be used to add, delete, update, and/or search information within the DB.

For example, the external electronic device 304 may store information for forming a virtual space, based on addition, deletion, and/or update of the position profile 460. Information stored in the position profile 460 may include the shape and/or size of a virtual object (e.g., the store 350 of FIG. 3) disposed in different parts of the virtual space. The information stored in the position profile 460 may include data (e.g., IP address and/or uniform resource identifier (URL)) to identify a portion of the virtual space and/or a server (e.g., another electronic device different from the external electronic device 304) linked to the virtual object disposed in the portion within the network. The information stored in the position profile 460 may include data (e.g., package name) indicating a portion of the virtual space and/or an application linked to the virtual object disposed in the portion. The information stored in the position profile 460 may include data (e.g., GPS coordinates) indicating a portion of the virtual space and/or a place of a real space linked to the virtual object disposed in the portion.

For example, the external electronic device 304 may store information on a user (e.g., the user 310 of FIG. 3) who has accessed the virtual space, based on addition, deletion, and/or update of the user profile 455. Information stored in the user profile 455 and corresponding to a specific user may be referred to as account information and/or user information. The user information may include data for visualizing an avatar (e.g., the avatar 330 of FIG. 3) corresponding to the user information in the virtual space. The data for visualizing the avatar may include point cloud, vertex data, and/or texture data for indicating the shape and/or size of the avatar. The user information may include data (e.g., ID, password, and/or single sign on (SSO) data for authenticating the user) to authenticate that a user corresponding to the user information uses the electronic device 302 different from the external electronic device 304. The user information may include a list of one or more electronic devices (e.g., the electronic device 302) used by the user corresponding to the user information to access the virtual space. The list may include data uniquely assigned to the one or more electronic devices, such as a MAC address. The user information may include a history of an action performed by the user corresponding to the user information based on the virtual space. The user information may include a history of an action of an avatar corresponding to the user information (e.g., a sequence of actions performed by the avatar). The user information may include a path in which the avatar corresponding to the user information is moved in the virtual space. The user information may include one or more multimedia contents obtained in the virtual space by the user corresponding to the user information.

In an embodiment, in a state that the server application 450 is executed, the external electronic device 304 may identify one or more electronic devices (e.g., the electronic device 302) connected to the external electronic device 304 to access the virtual space. The electronic device 302 may communicate with the external electronic device 304 or access a virtual space provided by the external electronic device 304, based on execution of the first application 440. In terms of accessing the virtual space for metaverse services, the first application 440 may be referred to as a metaverse application. In the electronic device 302, the second application 445 different from the first application 440 may be installed. The second application 445 may include a third-party application. In a state that the first application 440 and the first application 440 are executed, the electronic device 302 may obtain information for displaying at least a portion of the virtual space provided by the external electronic device 304, by communicating with the external electronic device 304. The electronic device 302 may display at least a portion of the virtual space in the display 420 based on the obtained information.

According to an embodiment, the electronic device 302 may identify a preset event based on data output from one or more sensors (e.g., the sensor 430). The preset event may occur due to a change in a state of the electronic device 302. For example, the preset event may occur in response to a movement of the electronic device 302 (e.g., a movement of the electronic device 302 by the user). The preset event may occur due to an interaction between the electronic device 302 and the user. For example, the preset event may occur, in response to an input (e.g., a shooting input) indicating to obtain multimedia content using the camera 425. The preset event may occur, based on a condition set by the first application 440 for receiving information associated with the virtual space from the external electronic device 304. The condition may be associated with a time and/or period reserved to receive the information from the external electronic device 304.

In an embodiment, in response to identifying occurrence of the preset event, the electronic device 302 may transmit a first signal for requesting information associated with both the virtual space and the preset events provided by the external electronic device 304, to the external electronic device 304 connected through the communication circuit 435-1. The first signal may include information indicating the preset event. The first signal may include information indicating a user logged in the electronic device 302 to access the virtual space distinguished by the first application 440, or to use the first application 440. For example, the first signal may include an ID uniquely assigned to the user.

According to an embodiment, the external electronic device 304 may obtain information associated with both the virtual space and preset events, based on the preset event indicated by the first signal and detected by the electronic device 302. The information may include multimedia content to be output through the display 420 of the electronic device 302 or stored in the memory 415-1 of the electronic device 302. The information may include a push message for executing the second application 445 different from the first application 440 of the electronic device 302. The information may be associated with an action performed by a user of the electronic device 302 in the virtual space based on an avatar corresponding to the user. The external electronic device 304 may transmit a second signal for providing the information obtained using the second application 445 different from the first application 440 associated with the virtual space, to the electronic device 302. When the external electronic device 304 transmits the second signal based on the push message to the electronic device 302, the external electronic device 304 may be referred to as a push server, in terms of transmitting the push message.

According to an embodiment, the electronic device 302 may receive the second signal corresponding to the first signal, from the external electronic device 304. In a state executable by the second application 445 different from the first application 440 for displaying the virtual space, the electronic device 302 may provide information included in the second signal, by controlling the display 420 based on receiving the second signal. That a state of the information is included in the state executable by the second application 445 may refer, for example, to the information being stored in a preset area (e.g., an application sandbox) and/or a partition accessible by the second application 445 within the memory 415-1 of the electronic device 302.

As described above, applications (e.g., the first application 440 and/or the server application 450) for executing a function associated with a virtual space may be installed in the electronic device 302 and the external electronic device 304 according to an embodiment. Information on interaction between the virtual space and the user of the electronic device 302 accumulated in the memory 415-2 of the external electronic device 304 based on the execution of the server application 450 may be transmitted to the electronic device 302, based on the preset event identified by the electronic device 302. For example, in response to occurrence of the preset event, the electronic device 302 may request at least a portion of the information from the external electronic device 304. The electronic device 302 receiving the information may provide the user of the electronic device 302 with the information associated with both the preset event and the virtual space, by storing the information in the memory 415-1 or displaying the information in the display 420.

Hereinafter, according to an embodiment, an example of an operation in which a user of the electronic device 302 accesses a virtual space provided by the external electronic device 304 will be described in greater detail below with reference to FIG. 5.

Figure 5:
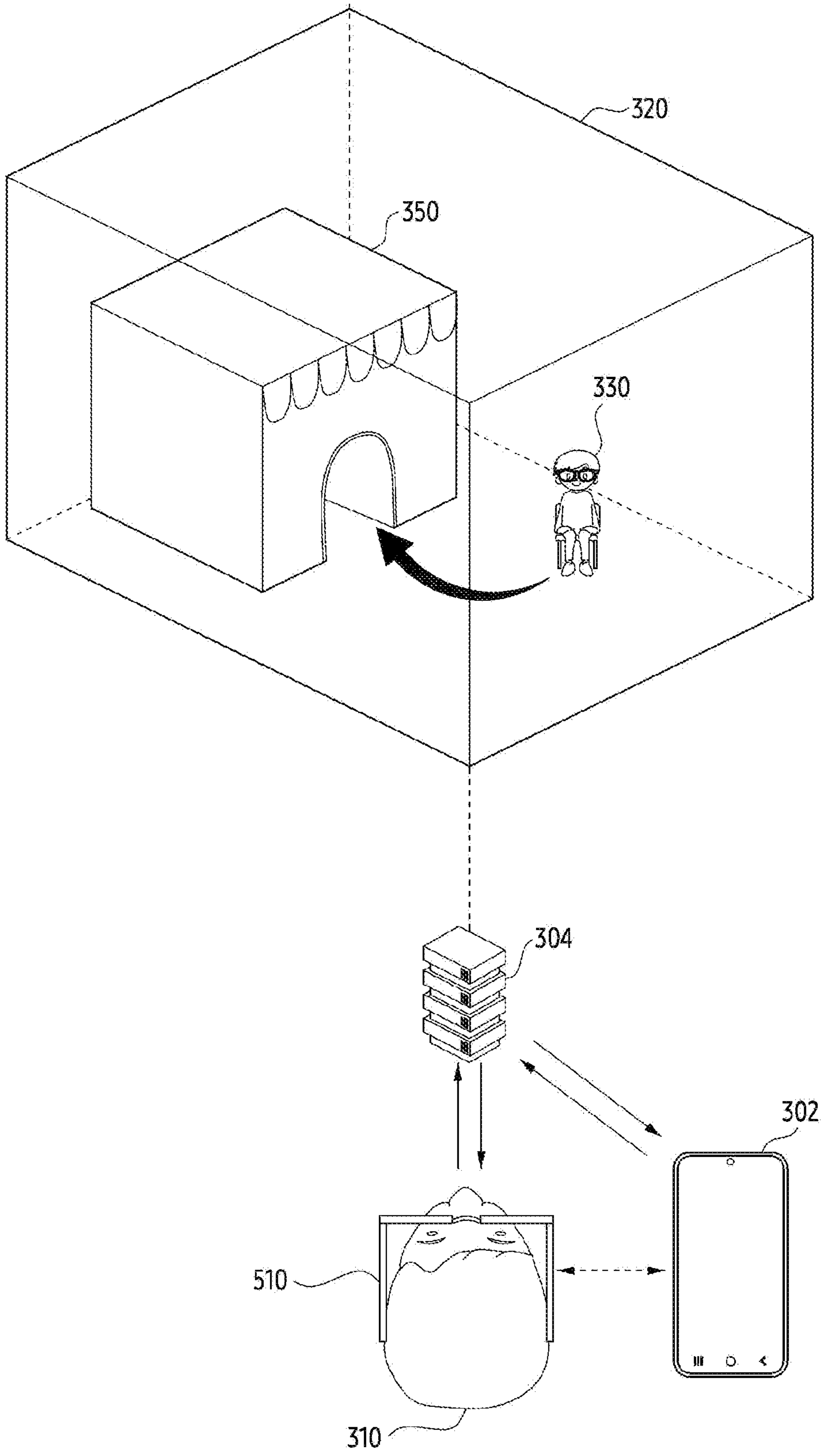
FIG. 5 is a diagram illustrating an example of a virtual space accessible by a terminal including an electronic device, according to an embodiment.

FIG. 5 is a diagram illustrating an example of a virtual space 320 accessible by a terminal including an electronic device 302, according to an embodiment. The electronic device 302 and the external electronic device 304 of FIG. 5 may be an example of the electronic device 302 and the external electronic device 304 of FIGS. 3 to 4. For example, the electronic device 302 and the external electronic device 304 of FIG. 4 may include the electronic device 302 of FIG. 5 and the external electronic device 304. The external electronic device 304 of FIG. 5 may be a server for providing the virtual space 320 of FIG. 3.

Referring to FIG. 5, a user terminal (e.g., the user terminal 120 of FIG. 1 to FIG. 2) owned by a user 310 may include an electronic device 302 and an HMD 510. The user 310 may access the virtual space 320 provided by the external electronic device 304 by selecting one of the electronic device 302 and/or the HMD 510. For example, the user 310 may input information (e.g., information for authenticating the user 310) for accessing the virtual space 320, by executing an application (e.g., the first application 440 of FIG. 4) installed in the HMD 510 in a state of wearing the HMD 510. Based on the information, the HMD 510 may request information to display at least a portion of the virtual space 320 from the external electronic device 304.

According to an embodiment, the external electronic device 304 may identify an avatar 330 corresponding to the user 310 in the virtual space 320, in response to the request. The external electronic device 304 may identify information (e.g., at least a portion of the user profile 455 of FIG. 4) for adding the avatar 330 into the virtual space 320, based on execution of the server application (e.g., the server application 450 of FIG. 4). Based on the identified information, the external electronic device 304 may add the avatar 330 in the virtual space 320. The external electronic device 304 may transmit information for displaying at least a portion of the virtual space 320 in which the avatar 330 is disposed, to the HMD 510. Based on receiving the information, the HMD 510 may output at least a portion of the virtual space 320 based on a viewpoint of the avatar 330 to the user 310.

According to an embodiment, the HMD 510 may identify an input indicating to control the avatar 330. A motion of the user 310 detected by the HMD 510 may include an input indicating to control the avatar 330. In a state of displaying at least a portion of the virtual space 320, the HMD 510 may obtain information for deformation and/or movement of the avatar 330, based on the motion of the user 310. The HMD 510 may transmit a signal to control the avatar 330, based on the obtained information to the external electronic device 304. In response to the signal, the external electronic device 304 may modify the shape and/or position of the avatar 330 disposed in the virtual space 320. The external electronic device 304 may transmit information for displaying at least a portion of the virtual space 320 in which the avatar 330 with the modified shape and/or position is disposed, to the HMD 510. The external electronic device 304 may store a modified history of the shape and/or position of the avatar 330 in the external electronic device 304.

Referring to FIG. 5, an example case in which the avatar 330 corresponding to the user 310 moves to the store 350, which is a virtual object formed in the virtual space 320, in the virtual space 320 provided by the external electronic device 304 based on the motion of the user 310 detected by the HMD 510 is illustrated. The store 350 may be formed in the virtual space 320 by information stored in the external electronic device 304 (e.g., the position profile 460 of FIG. 4) as a virtual object disposed in a portion of the virtual space 320. The information may include data to identify an application linked to the store 350 and/or a place in the real space linked to the store 350. For example, the information may include at least one of a package name of the application and/or a GPS coordinate of the place.

According to an embodiment, the external electronic device 304 may monitor and/or parameterize an action of the user 310 who has accessed the virtual space 320, based on an action and/or path of the avatar 330 in the virtual space 320. Based on identifying that the avatar 330 moves to the store 350, the external electronic device 304 may store the path of the avatar 330 moved to the store 350. Based on identifying that the avatar 330 moves to the store 350, the external electronic device 304 may store the store 350 in a point of interest (POI) for the avatar 330 and/or the user 310.

According to an embodiment, a service provided by the external electronic device 304 to the user 310 based on the virtual space 320 may be classified according to a virtual object, such as the store 350, included in the virtual space 320 and/or a position in the virtual space 320. For example, the store 350 may be embedded in the virtual space 320 to provide a service (e.g., a third-party service provided by a server different from the external electronic device 304) for searching and/or purchasing products. Based on identifying the avatar 330 moved to the store 350, the external electronic device 304 may transmit information 510 for displaying a screen associated with the store 350 to the HMD. When the external electronic device 304 provides information on one or more products (e.g., one or more products included in the store 350) provided through the virtual space based on the motion of the user 310 detected by the HMD 510 to the HMD 510, the external electronic device 304 may store the one or more products as products provided to the user 310. Monitoring and/or parameterizing an interaction between the virtual space 320 and the user 310 by the external electronic device 304 is not limited to the example. For example, in response to an input indicating to obtain multimedia content representing at least a portion of the virtual space 320, the external electronic device 304 may store information (e.g., metadata) on an action of the user 310 to obtain the multimedia content together with the multimedia content.

Although an embodiment in which an interaction between the user 310 and the virtual space 320 is performed based on the HMD 510 and the external electronic device 304 connected to the HMD 510 has been described, embodiments of the disclosure are not limited thereto. For example, the user 310 may access the virtual space 320 using the electronic device 302. In an example case where the user 310 owns different electronic devices (e.g., the HMD 510 and/or the electronic device 302), the external electronic device 304 may provide information on the virtual space 320 associated with the avatar 330 corresponding to the user 310 to both the HMD 510 and the electronic device 302 to which the user 310 is logged in. For example, a history in which the avatar

330 of the user 310 is moved to the store 350 in the virtual space 320 based on the HMD 510 may be shared with the electronic device 302.

According to an embodiment, the electronic device 302 may request information associated with an action of the user 310 performed based on the avatar 330 in the virtual space 320 from the external electronic device 304, based on whether the preset event occurred. Based on receiving the information from the external electronic device 304, the electronic device 302 may display the information linked to the preset event. Based on displaying the information, the electronic device 302 may display the information linked to both the preset event occurred in the real space by the user 310 and the virtual space 320. Since the information displayed through the electronic device 302 is linked to both the preset event occurred in the real space and the virtual space 320, the electronic device 302 may provide a boundary-free user experience between the real space and the virtual space 320.

Hereinafter, an example of an operation in which the electronic device 302 according to an embodiment requests information associated with the virtual space 320 to the external electronic device 304 based on a preset event occurred based on a position of the electronic device 302 will be described in greater detail below with reference to FIGS. 6 and 7.

Figure 6:
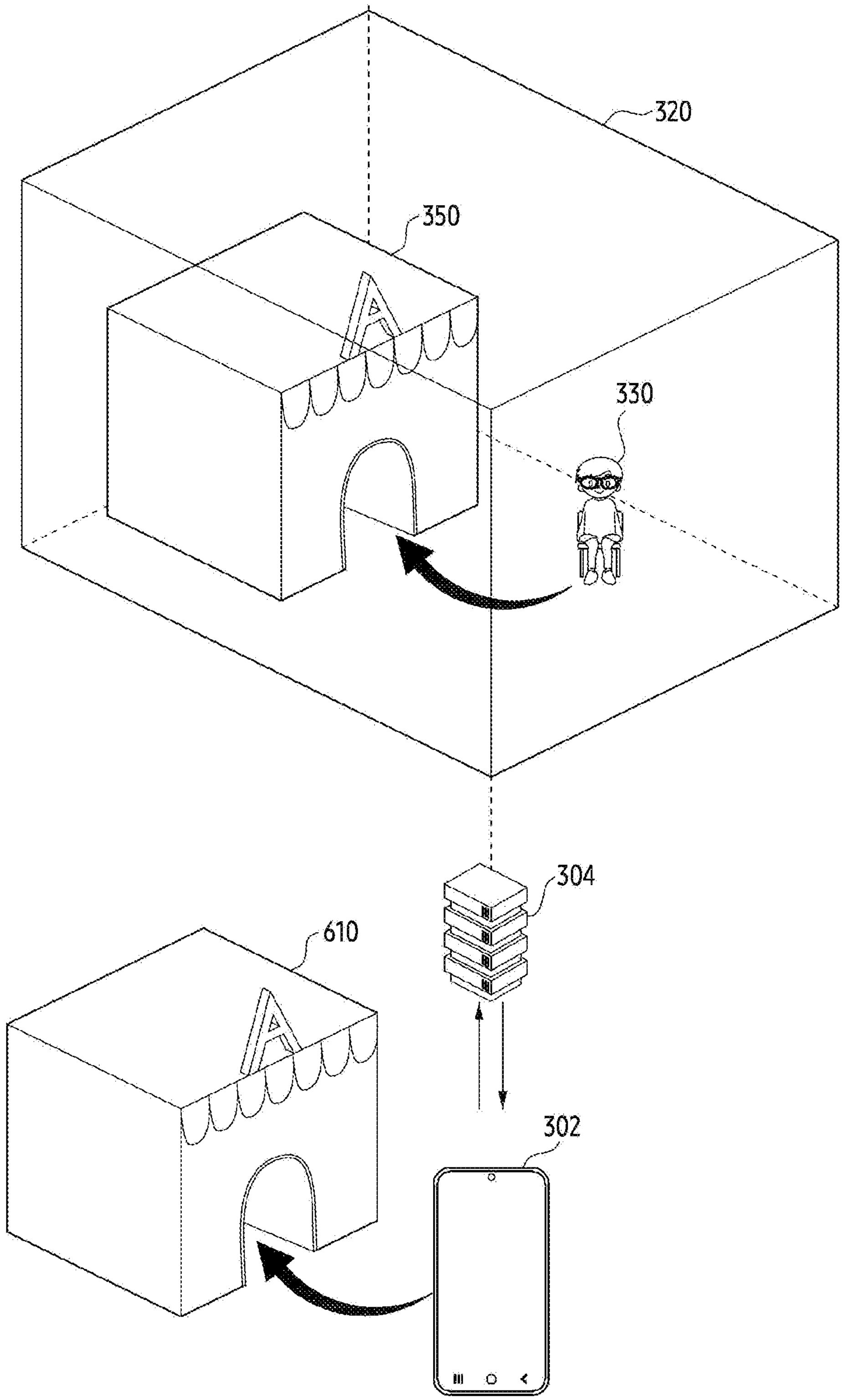
FIG. 6 is a diagram illustrating an example of an operation in which an electronic device obtains information on a virtual space based on a position of the electronic device, according to an embodiment.

FIG. 6 is a diagram illustrating an example of an operation in which an electronic device 302 obtains information on a virtual space 320 based on a position of the electronic device, according to an embodiment. The electronic device 302 and the external electronic device 304 of FIG. 6 may be an example of the electronic device 302 and the external electronic device 304 of FIGS. 3 to 4. For example, the electronic device 302 and the external electronic device 304 of FIG. 4 may include the electronic device 302 and the external electronic device 304 of FIG. 6. The external electronic device 304 of FIG. 6 may be a server for providing the virtual space 320 of FIG. 3.

Referring to FIG. 6, the virtual space 320 accessible by the electronic device 302 and provided by the external electronic device 304 may be at least partially linked with the real space. As described above with reference to FIGS. 3 to 5, the external electronic device 304 may dispose a store 350 linked to a place 610 of the real space in the virtual space 320. Although the store 350, which is a virtual object in a form of a building, is illustrated, embodiments are not limited thereto. In a state that the virtual space 320 is browsed based on the electronic device 302, the user (e.g., the user 310 of FIG. 3) of the electronic device 302 may perform an action associated with the store 350 based on the avatar 330. The action may be monitored by the external electronic device 304.

According to an embodiment, the electronic device 302 may detect an event associated with the real space. For example, the electronic device 302 may identify a modification of a position of the electronic device 302 based on data of a sensor (e.g., the sensor 430 in FIG. 4). In the example, the electronic device 302 may detect an event in which the electronic device 302 is moved to the place 610 in the real space, based on the modification of the position indicated by data. Based on linkage between the virtual space 320 and the real space, the electronic device 302 may identify whether the detected event has occurred within the place 610 linked to the virtual space 320. In response to identifying that the event has occurred within the place 610 of the real space linked to the virtual space 320, the electronic device 302 may transmit a first signal to request information associated with the virtual space 320 linked to the position of the electronic device 302 in the place 610 and/or the place 610, to the external electronic device 304. For example, based on the preset event occurring by the modification of the position of the electronic device 302, the electronic device 302 may transmit the first signal to request information associated with a portion of the virtual space 320 linked to the modified position of the electronic device 302, to the external electronic device 304.

According to an embodiment, the external electronic device 304 may identify the position of the electronic device 302 in which the preset event has occurred based on the first signal. The external electronic device 304 may identify information associated with a portion of the virtual space 320 linked to the identified position. In the example case of FIG. 6 in which the electronic device 302 is included in the place 610 in the real space linked to the store 350 in the virtual space 320, the external electronic device 304 may transmit information associated with the store 350 in the virtual space 320 to the electronic device 302. The external electronic device 304 may obtain the information to be transmitted to the electronic device 302 based on the action of the avatar 330 performed in the store 350. For example, when the user of the electronic device 302 browses and/or searches one or more products using the avatar 330 in the store 350, the external electronic device 304 may obtain information (e.g., product information, product recommendation information, and/or coupon information) on the one or more products. For example, when the user of the electronic device 302 switches clothing and/or accessories of the avatar 330 in the store 350 based on at least one virtual object provided through the store 350, the external electronic device 304 may obtain information on the at least one virtual object. The external electronic device 304 may transmit a second signal including the obtained information to the electronic device 302 as a response to the first signal.

As described above, according to an embodiment, the external electronic device 304 may transmit the second signal including the information to inform information on a portion (e.g., store 350) of the virtual space 320 linked to the position (e.g., the place 610) of the electronic device 302, to the electronic device 302. For example, the external electronic device 304 may transmit the second signal including a push message for executing a specific application to the electronic device 302. An application in the electronic device 302 executed by the push message in the second signal may be a second application (e.g., the second application 445 of FIG. 4) different from the first application (e.g., the first application 440 of FIG. 4), the second application being set to access the virtual space 320 or to communicate with the external electronic device 304.

Hereinafter, an example of an operation of the electronic device 302 receiving the second signal including the push message will be described in greater detail below with reference to FIG. 7.

Figure 7:
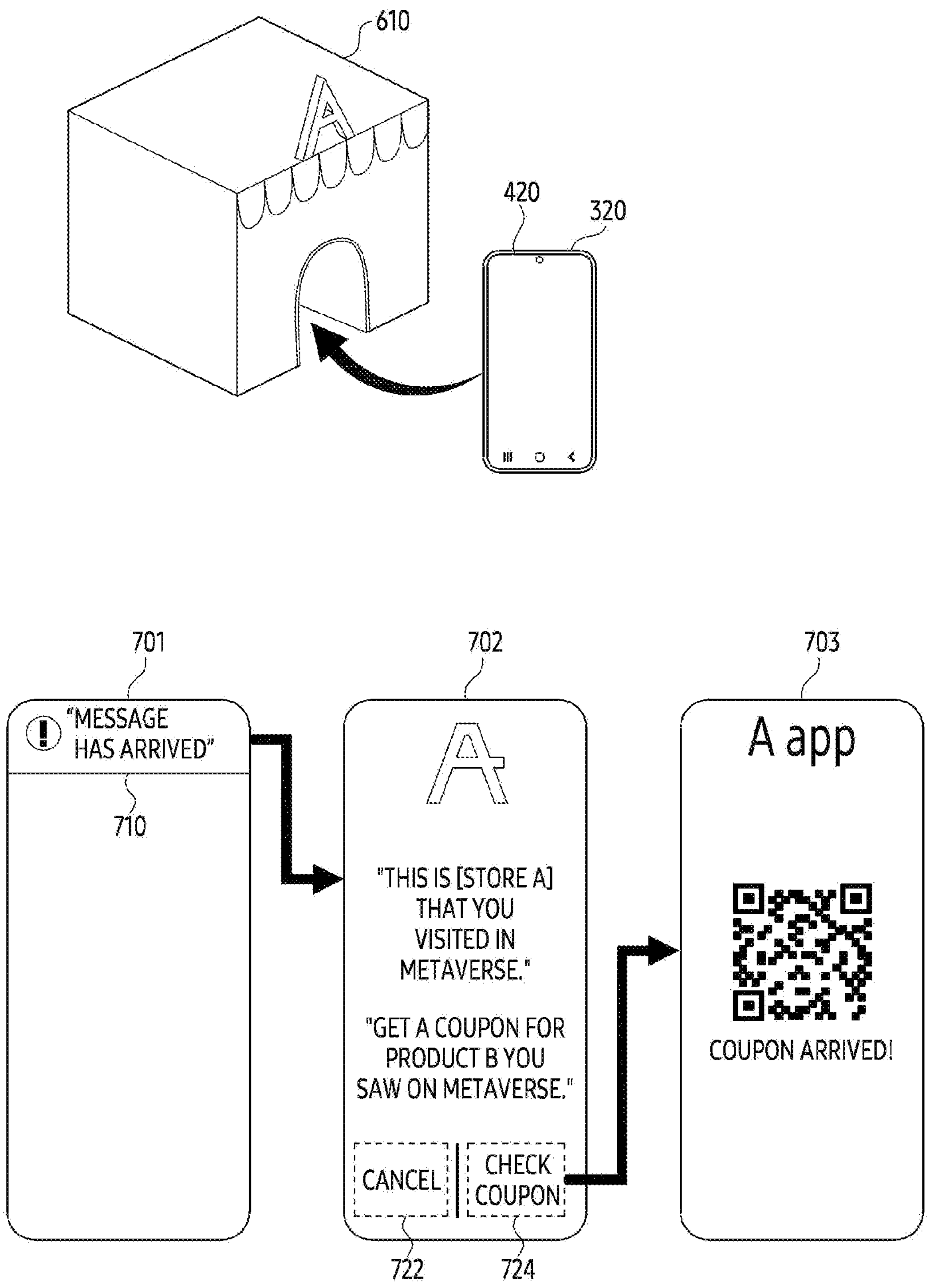
FIG. 7 is a diagram illustrating an example of a user interface (UI) displayed by an electronic device based on information on a virtual space, according to an embodiment.

FIG. 7 is a diagram illustrating an example of a user interface (UI) displayed by an electronic device 302 based on information on a virtual space, according to an embodiment. The electronic device 302 of FIGS. 3 to 4 may include the electronic device 302 of FIG. 7.

As described above with reference to FIG. 6, according to an embodiment, the electronic device 302 may transmit a first signal to request information associated with a portion of the virtual space (e.g., the virtual space 320 of FIGS. 3 and/or 5 to 6) linked to the position of the electronic device 302, based on modification of the position in the real space, to an external electronic device (e.g., the external electronic device 304 of FIG. 6) connected to the electronic device 302. For example, based on identifying that the electronic device 302 is moved to the place 610, the electronic device 302 may transmit the first signal to the external electronic device. The electronic device 302 may receive a second signal from the external electronic device, in response to the first signal.

Referring to FIG. 7, screens 701, 702, and 703 displayed by the electronic device 302 in the display 420 in a state of receiving the second signal including a push message from an external electronic device (e.g., the external electronic device 304 of FIG. 6) are illustrated. Hereinafter, the screen may refer to a user interface (UI) displayed within at least a portion of a display. For example, the screen may include an activity of an Android operating system. The electronic device 302 may display the screen 701 including a visual object 710 in the form of a pop-up notification based on the push message, in response to the push message included in the second signal transmitted from the external electronic device. Although an example in which the visual object 710 is displayed along a periphery (e.g., the top of the screen 701) of the screen 701 is illustrated, embodiments are not limited thereto, and the electronic device 302 may display the visual object 710 in a portion of the screen 701 spaced apart from peripheries of the screen 701, such as toast.

Referring to FIG. 7, the electronic device 302 may output the screen 702 for displaying information in the second signal received from the external electronic device in the screen 701, in response to an input indicating to select the visual object 710. The input indicating to select the visual object 710 may be identified by a gesture of touching and/or clicking the visual object 710 and/or a gesture of dragging the visual object 710 along a preset direction (e.g., a direction perpendicular to one periphery of the screen 701 on which the visual object 710 is displayed and facing the inside of the screen 701).

Referring to FIG. 7, in the screen 702, based on information in the second signal, the electronic device 302 may display text (e.g., "This is Store A that you visited in Metaverse.") to guide that the position of the electronic device 302 is linked to at least a portion of the virtual space. When information (e.g., coupon) based on an action (e.g., the action of the avatar controlled by the user of the electronic device 302) collected within a portion (e.g., the store 350 of FIG. 6) of the virtual space linked to the position (e.g., the place 610) of the electronic device 302 is included in the second signal transmitted from the external electronic device, the electronic device 302 may display text (e.g., "Get a coupon for product B you saw on Metaverse.") associated with the information in the screen 702. The electronic device 302 may display a visual object 722 in the form of a button for at least temporarily suspending a display of the screen 702 within the screen 702. In the visual object 722, the electronic device 302 may display a preset text (e.g., "cancel") for guiding to display another screen prior to displaying the screen 702.

In the screens 701 and 702 of FIG. 7, the electronic device 302 may identify an input indicating to execute an application associated with the position of the electronic device 302, indicated by the second signal received from the external electronic device 302. In the screen 702, the electronic device 302 may display a visual object 724 in the form of a button for receiving the input. The electronic device 302 may display preset text (e.g., "Check coupon", and/or "Launch application") to guide execution of the application in the visual object 724. In an embodiment, the electronic device 302 may identify the input based on different gestures based on the visual object 710 in the screen 701. For example, the electronic device 302 may switch the screen 702 based on a gesture of dragging the visual object 710, and identify the input based on a gesture of tapping the visual object 710. In response to identifying the input, the electronic device 302 may execute the application corresponding to the input.

According to an embodiment, in response to an input indicating to execute an application indicated by the second signal transmitted from the external electronic device, the electronic device 302 may execute the second application different from the first application for displaying the virtual space (e.g., the virtual space 320 of FIGS. 3 and/or FIGS. 5 to 6) provided by the external electronic device. The first application may correspond to the first application 440 of FIG. 4, and the second application may correspond to the second application 445 of FIG. 4.

Referring to FIG. 7, in response to the input, the electronic device 302 may display the screen 703 provided from the second application by executing the second application. In a state of executing the second application in response to the input, the electronic device 302 may display the screen 703 selected by the push message in the second signal among the different screens provided by the second application. In the screen 703, the electronic device 302 may display at least a portion of information included in the second signal transmitted from the external electronic device. Referring to the screen 703 of FIG. 7, when the electronic device 302 identifies the information associated with a coupon in the second signal, the electronic device 302 may display a quick response (QR) code corresponding to the coupon in the screen 703.

As described above, according to an embodiment, the electronic device 302 may request information associated with an action performed in a portion of the virtual space linked to the position of the electronic device 302 from the external electronic device, among actions (e.g., the action performed by controlling the avatar 330 of FIG. 6) performed by the user of the electronic device 302 within the virtual space provided by the external electronic device. Requesting the information by the electronic device 302 to the external electronic device may be performed, in response to occurrence of a preset event moved to the place 610 in the real space linked to at least a portion (e.g., the store 350 of FIG. 6) of the virtual space. The electronic device 302 may display at least a portion of the received information based on receiving the information from the external electronic device. The at least a portion of the information may be displayed through the second application different from the first application for executing a function associated with the virtual space, as shown in the screen 703 of FIG. 7.

Hereinafter, according to an embodiment, an example of an operation of the electronic device 302 searching for second multimedia content obtained in the virtual space provided by the external electronic device and associated with the first multimedia content obtained through the camera of the electronic device 302 will be described in greater detail below with reference to FIGS. 8 and 9.

Figure 8:
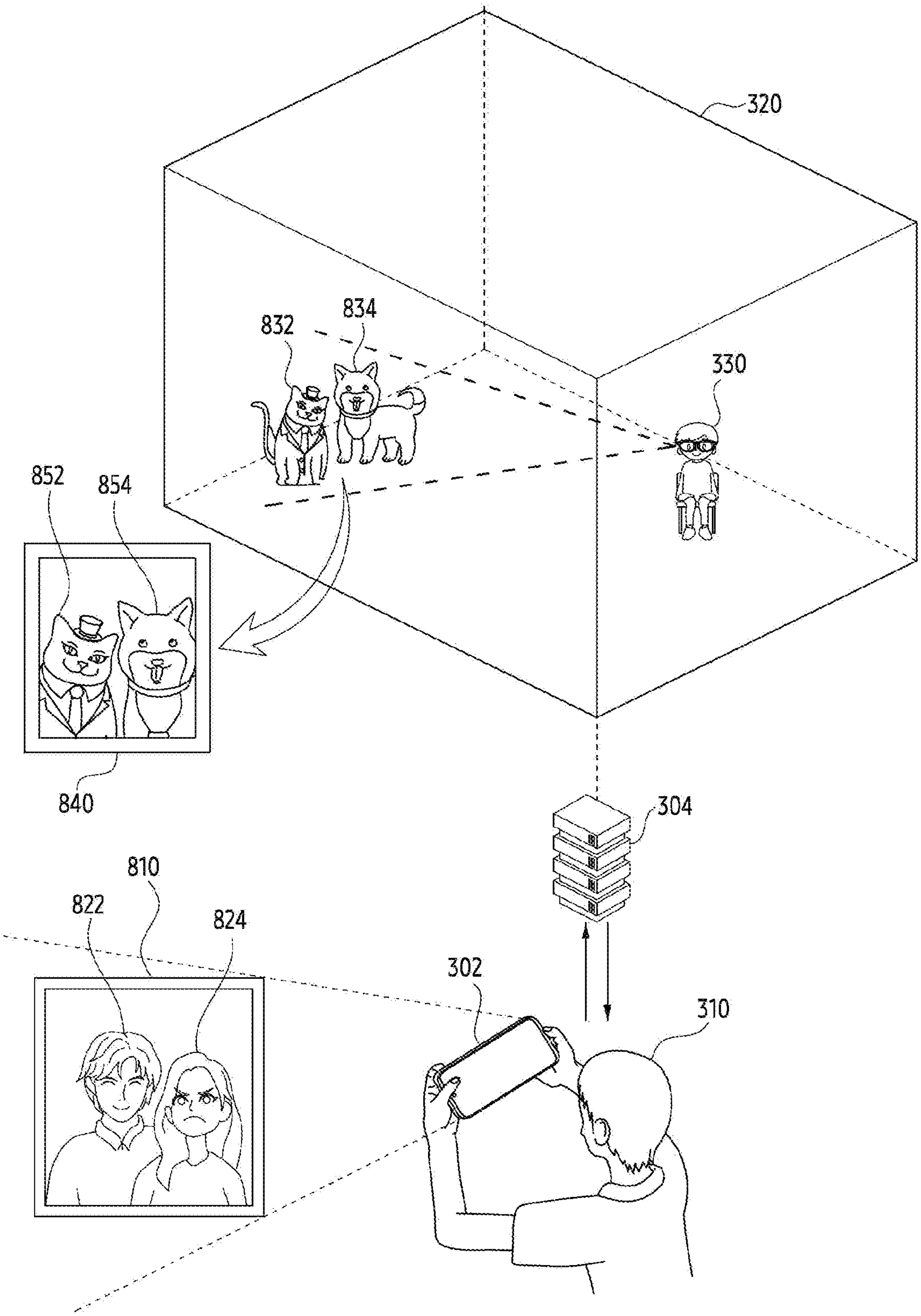
FIG. 8 is a diagram illustrating an example of an operation in which an electronic device obtains multimedia content including at least a portion of a virtual space, according to an embodiment.

FIG. 8 is a diagram illustrating an example of an operation in which an electronic device 302 obtains multimedia content 840 including at least a portion of a virtual space 320, according to an embodiment. The electronic device 302 and the external electronic device 304 of FIG. 8 may be an example of the electronic device 302 and the external electronic device 304 of FIGS. 3 to 4. For example, the electronic device 302 and the external electronic device 304 of FIG. 4 may include the electronic device 302 and the external electronic device 304 of FIG. 8.

The external electronic device 304 of FIG. 8 may be a server for providing the virtual space 320 of FIGS. 3 and 4 to 5. The external electronic device 304 may provide different functions associated with the virtual space 320 to different users (e.g., the user 310), using electronic devices (e.g., the electronic device 302) connected to the external electronic device 304. The function may include a function of obtaining an image and/or a video representing at least a portion of the virtual space 320.

Referring to FIG. 8, in an example case in which the user 310 of the electronic device 302 controls the avatar 330 disposed in the virtual space 320, the electronic device 302 may identify an input indicating to photograph at least a portion of the virtual space 320 by controlling the avatar 330. In response to the input, the electronic device 302 may request the external electronic device 304 to obtain multimedia content including the image and/or video representing the at least a portion of the virtual space 320. In an example case of FIG. 8, based on the request, the external electronic device 304 may obtain multimedia content 840 representing a portion of the virtual space 320 including avatars 832 and 834 in the virtual space 320. Referring to FIG. 8, the multimedia content 840 may include visual objects 852 and 854 corresponding to each of the avatars 832 and 834. Metadata corresponding to the multimedia content 840 may include information for identifying users corresponding to each of the avatars 832 and 834. The external electronic device 304 may store the multimedia content 840 in the external electronic device 304.

Referring to FIG. 8, according to an embodiment, the electronic device 302 may obtain multimedia content (e.g., image and/or video) for the real space, using an image sensor such as a camera (e.g., the camera 425 of FIG. 4). Referring to FIG. 8, an example case in which the electronic device 302 obtains the multimedia content 840 in response to an input (e.g., a photographing input) to obtain an image is illustrated. The multimedia content 840 may include visual objects 822 and 824 corresponding to different users. The electronic device 302 may identify users corresponding to the visual objects 822 and 824 in the multimedia content 840, based on input and/or image recognition associated with the multimedia content 840. For example, the electronic device 302 may identify the visual objects 822 and 824 and users mapped to each of the visual objects 822 and 824 within the multimedia content 840, based on information (e.g., tags) input by the user 310. For example, the electronic device 302 may identify the visual objects 822 and 824 including users' faces within the multimedia content 840, based on image recognition. The electronic device 302 may store information for distinguishing the visual objects 822 and 824 in metadata corresponding to the multimedia content 840.

Referring to FIG. 8, the electronic device 302 may request another multimedia content associated with the multimedia content 810 to the external electronic device 304, based on obtaining the multimedia content 810. For example, based on a preset event occurred by obtaining the multimedia content 810, the electronic device 302 may transmit a first signal for requesting at least one another multimedia content associated with the multimedia content 810 and obtained in the virtual space 320, to the external electronic device 304. The electronic device 302 may transmit the first signal including metadata corresponding to the multimedia content 810 to the external electronic device 304. The first signal may include at least one of the multimedia content 810 or the metadata. The metadata may include data for identifying one or more users (e.g., users corresponding to the visual objects 822 and 824) included the multimedia content 810 or the position in which the multimedia content 810 is obtained.

According to an embodiment, in response to receiving the first signal, the external electronic device 304 connected to the electronic device 302 may identify at least one multimedia content associated with the multimedia content 810 identified by the first signal, among multimedia content (e.g., the multimedia content 840) stored in the external electronic device 304. Based on the first signal, the external electronic device 304 may identify at least one user (e.g., users corresponding to the visual objects 822 and 824) associated with the first multimedia content 810 or at least one of a position in which the first multimedia content 810 is obtained. Based on metadata included in the first signal and corresponding to the first multimedia content 810, the external electronic device 304 may identify at least one of the position or the at least one user.

According to an embodiment, based on at least one avatar corresponding to at least one user associated with the first multimedia content 810 or a position associated with the first multimedia content 810 in the virtual space 320, the external electronic device 304 may identify or search at least one multimedia content associated with the first multimedia content 810 among multimedia content stored in the external electronic device 304. For example, the external electronic device 304 may select at least one multimedia content including at least one avatar matched to at least one user associated with the first multimedia content 810 from among multimedia content stored in the external electronic device 304. For example, the external electronic device 304 may select at least one multimedia content obtained within a portion of the virtual space 320 linked to a position of the real space in which the first multimedia content 810 is obtained, from among the multimedia content stored in the external electronic device 304.

In the example case of FIG. 8, when the avatars 832 and 834 in the virtual space 320 are matched users corresponding to the visual objects 822 and 824 of the first multimedia content 810, the external electronic device 304 may select the second multimedia content 840 including the visual objects 852 and 854 corresponding to the avatars 832 and 834 as multimedia content associated with the first multimedia content 810. The external electronic device 304 may transmit the second signal including at least one content (e.g., the second multimedia content 840) associated with the first multimedia content 810 to the electronic device 302 as a response to the first signal. The external electronic device 304 may transmit the second signal for storing the second multimedia content 840 to the electronic device 302, by linking with the first multimedia content 810.

According to an embodiment, in response to a second signal transmitted from the external electronic device 304, the electronic device 302 may store at least one content (e.g., the second multimedia content 840) included in the second signal in a memory (e.g., the memory 415-1 of the electronic device 302 of FIG. 4) of the electronic device. The electronic device 302 may store the at least one content in a state browsable by a preset application (e.g., a gallery application) for browsing one or more multimedia contents stored in the electronic device 302. In the example case of FIG. 8, in which the external electronic device 304 transmits the second signal including the second multimedia content 840 to the electronic device 302, the electronic device 302 may store the second multimedia content 840 by linking with the first multimedia content 810.

Hereinafter, an example of an UI displayed by the electronic device 302 based on the preset application in a state in which the second multimedia content 840 in a state linked to the first multimedia content 810 is stored will be described.

Figure 9:
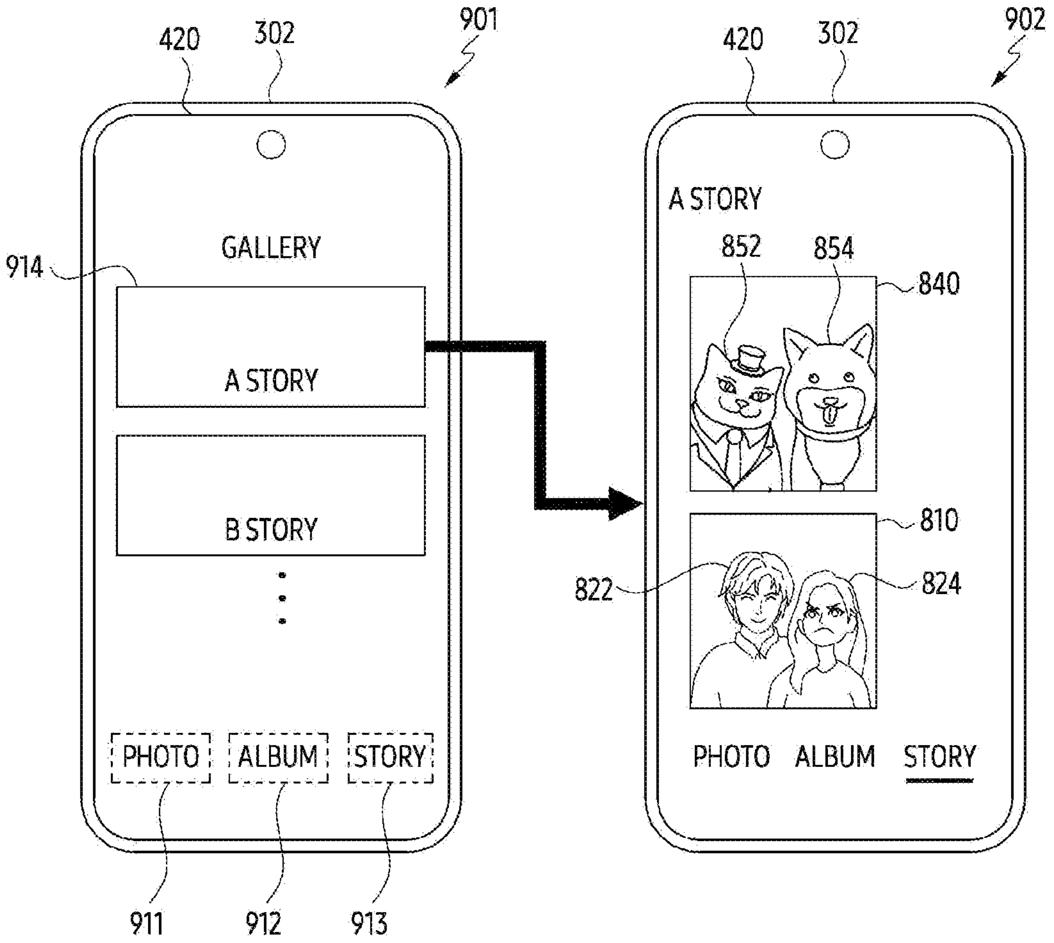
FIG. 9 is a diagram illustrating an example of a UI in which an electronic device displays multimedia content associated with a virtual space, according to an embodiment.

FIG. 9 is a diagram illustrating an example of a UI in which an electronic device 302 displays multimedia content associated with a virtual space, according to an embodiment. The electronic device 302 of FIGS. 3 to 4 may include the electronic device 302 of FIG. 9. For example, the electronic device 302 and the display 420 of FIG. 4 may include the electronic device 302 and the display 420 of FIG. 9.

As described above with reference to FIG. 8, according to an embodiment, the electronic device 302 may obtain the second multimedia content 840 including an image and/or video associated with a virtual space (e.g., the virtual space 320 provided by the external electronic device 304 of FIG. 8), associated with the first multimedia content 810 including images and/or videos associated with the real space. The electronic device 302 may transmit a first signal for requesting at least one multimedia content associated with the first multimedia content 810, to an external electronic device (e.g., the external electronic device 304 of FIG. 8) in which an application (e.g., the server application 450 of FIG. 4) associated with the virtual space is executed. The external electronic device may transmit a second signal including the second multimedia content 840 to the electronic device 302 in response to the first signal. Although an embodiment in which the external electronic device transmits one multimedia content (e.g., the second multimedia content 840) to the electronic device 302 is described, the number of multimedia contents transmitted by the external electronic device to the electronic device 302 is not limited thereto. Based on the second signal, the electronic device 302 may store the second multimedia content 840 included in the second signal within the memory of the electronic device 302, within a state linked with the first multimedia content 810. Referring to FIG. 9, according to an embodiment, states 901 and 902 in which the electronic device 302 displays screens provided from a second application (e.g., the second application 445 of FIG. 4) different from a first application (e.g., the first application 440 of FIG. 4) supporting a function associated with the virtual space in the display 420 are illustrated. The second application may include an application for browsing one or more multimedia contents stored in the electronic device 302, such as a gallery application. The second application may not support a function for accessing the virtual space. The states 901 and 902 may be an example state in which the electronic device 302 displays screens provided by the second application in the display 420 in response to an input indicating to execute the second application.

In the state 901 of FIG. 9, the electronic device 302 may display a screen for browsing multimedia content stored in the electronic device 302 in the display 420. In the state 901, the electronic device 302 may display visual objects 911, 912, and 913 to modify a category of multimedia content displayed through the display 420. For example, in response to an input indicating to select the visual object 911, the electronic device 302 may display a list of images in the display 420 from among multimedia content stored in the electronic device 302. In response to an input indicating to select the visual object 912, the electronic device 302 may display a list of at least one group generated by grouping multimedia content stored in the electronic device 302. The at least one group may be generated based on an input for grouping one or more multimedia contents. The at least one group may be referred to as an album. In response to an input indicating to select the visual object 913, the electronic device 302 may display a list of multimedia content (e.g., story content) generated by combining multimedia content stored in the electronic device 302 in the display 420.

The state 901 of FIG. 9 may be an example state in which the electronic device 302 displays a list of at least one multimedia content generated by combining multimedia content in the display 420 based on the input indicating to select the visual object 913. For example, multimedia content corresponding to a visual object 914 may be generated by synthesizing a plurality of multimedia content (e.g., the first multimedia content 810 and the second multimedia content 840) linked to each other, among the multimedia content stored in the electronic device 302. For example, the electronic device 302 may generate multimedia content (e.g., video data) corresponding to the visual object 914, by combining the plurality of multimedia contents linked to each other in a time domain. For example, the electronic device 302 may generate multimedia content (e.g., video data and/or image data) corresponding to the visual object 914, by connecting the plurality of multimedia contents linked to each other within the frame in parallel.

Referring to FIG. 9, in response to an input indicating to select the visual object 914, the electronic device 302 may be modified to the state 902 for displaying multimedia content corresponding to the visual object 914. In the state 902, the electronic device 302 may display the first multimedia content 810 and the second multimedia content 840 combined by multimedia content corresponding to the visual object 914 within the display 420. In the multimedia content corresponding to the visual object 914, the first multimedia content 810 and the second multimedia content 840 may be connected in parallel as shown in the state 902 of FIG. 9. Embodiments are not limited thereto, and the first multimedia content 810 and the second multimedia content 840 may be disposed in different time domains within the multimedia content corresponding to the visual object 914.

As described above, since the multimedia content corresponding to the visual object 914 includes both the first multimedia content 810 and the second multimedia content 840, the electronic device 302 may provide a user with multimedia content in which a real space and a virtual space are interconnected. For example, since the first multimedia content 810 and the second multimedia content 840 including the visual objects 822 and 852 corresponding to each of a specific user's face and avatar are displayed as a group, the electronic device 302 may provide a boundary-free user experience between the real space and the virtual space.

According to an embodiment, multimedia content obtained by the electronic device 302 from the external electronic device is not limited to multimedia content generated by an action (e.g., action to capture at least a portion of the virtual space) triggered by a user, such as the second multimedia content 840. For example, the electronic device 302 may obtain one or more multimedia contents that are automatically generated by the external electronic device and represent the user's action associated with the virtual space of the electronic device 302.

Hereinafter, according to an embodiment, an example of an operation in which the electronic device 302 obtains one or more multimedia contents representing the user's action associated with the virtual space from the external electronic device will be described in greater detail below with reference to FIG. 10.

Figure 10:
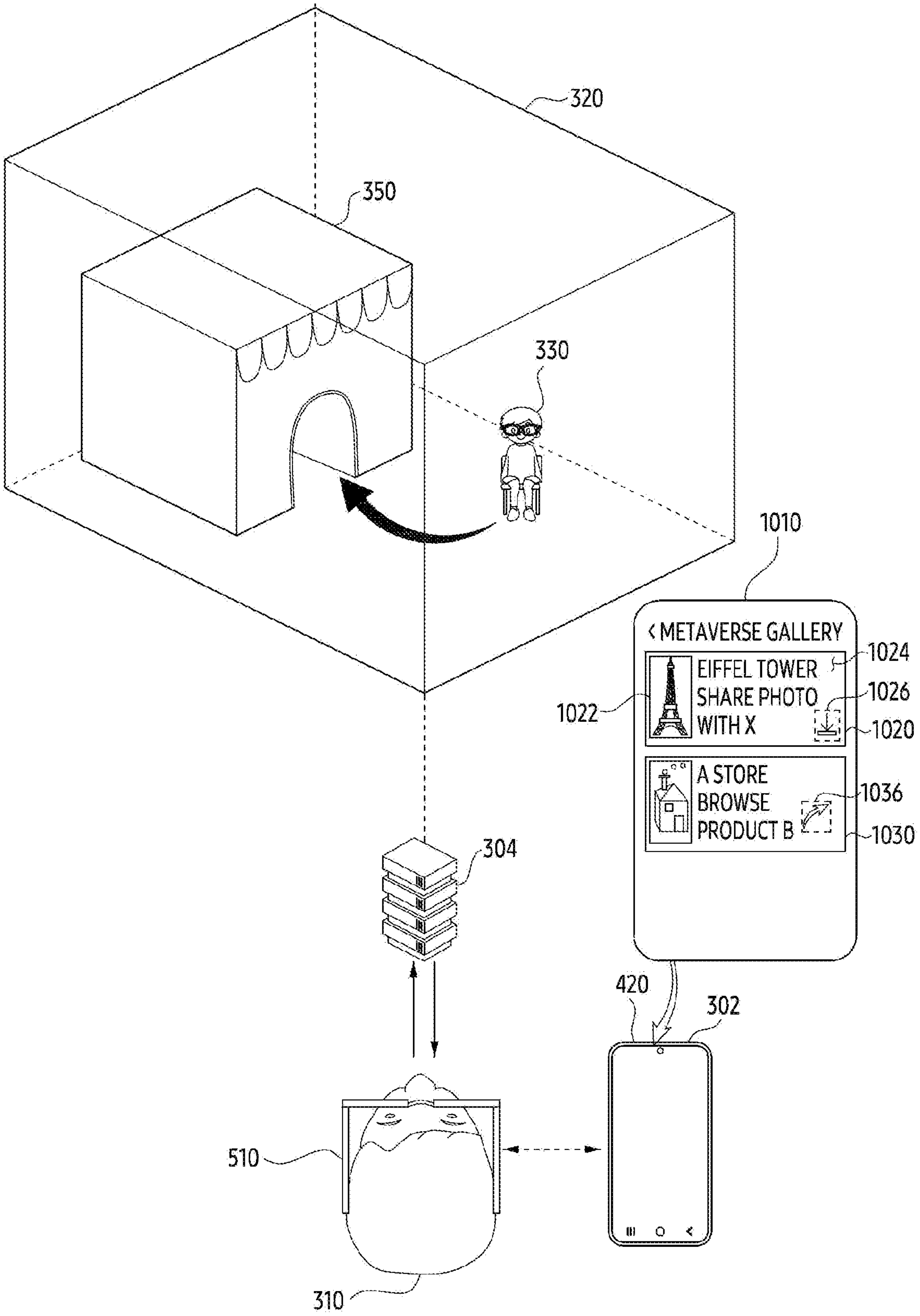
FIG. 10 is a diagram illustrating an example of a UI in which an electronic device displays multimedia content associated with a virtual space, according to an embodiment.

FIG. 10 is a diagram illustrating an example of a UI in which an electronic device 302 displays multimedia content associated with a virtual space 320, according to an embodiment. The electronic device 302 and the external electronic device 304 of FIG. 10 may include the electronic device 302 and the external electronic device 304 of FIGS. 3 and 4. The HMD 510 of FIG. 10 may include the HMD 510 of FIG. 5.

According to an embodiment, the external electronic device 304 may transmit information associated with the virtual space 320 to a user terminal (e.g., the electronic device 302, and/or the HMD 510) owned by the user 310 as a server for providing the virtual space 320. As described above with reference to FIG. 5, the external electronic device 304 may receive information for controlling the virtual space 320 and/or the avatar 330 in the virtual space 320 corresponding to the user 310 from the user terminal. The user 310 may access the virtual space 320 using the user terminal. Based on the information received from the user terminal, the external electronic device 304 may accumulate and/or store an action of the user 310 performed in the virtual space 320. For example, the external electronic device 304 may store a history of the action of the user 310 identified by the user terminal and performed on the virtual space 320 within a database, such as the user profile 455 of FIG. 4.

According to an embodiment, the electronic device 302 may request information associated with the history stored in the external electronic device 304 to the external electronic device 304. Requesting the information by the electronic device 302 may be performed based on execution of the second application (e.g., the second application 445 of FIG. 4) different from the first application (e.g., the first application 440 of FIG. 4) for accessing the virtual space 320. The second application may include a preset application for browsing one or more multimedia contents stored in the electronic device 302, such as the gallery application of FIG. 9. For example, the electronic device 302 may transmit the first signal for requesting information associated with the history stored in the external electronic device 304 to the external electronic device 304.

In an embodiment, based on receiving the first signal, the external electronic device 304 may transmit the second signal including one or more multimedia contents representing an action of the user 310 that is performed for the virtual space 320 and stored in the external electronic device 304, to the electronic device 302. The electronic device 302 may store the one or more multimedia contents included in the second signal based on a state accessible by the second application. Referring to FIG. 10, based on execution of the second application, the electronic device 302 may display a screen 1010 including a list of the one or more multimedia contents stored in the electronic device 302 based on the second signal in the display 420. The screen 1010 may be displayed by the electronic device 302 in response to an input indicating to select a visual object in the form of a button having a preset name (e.g., metaverse gallery).

Referring to FIG. 10, in the screen 1010, the electronic device 302 may display visual objects 1020 and 1030 corresponding to each of multimedia content. The visual object 1020 may correspond to multimedia content representing an action accessing a portion (e.g., a portion of the virtual space 320 linked to a landmark of the real space, such as the Eiffel Tower) of the virtual space 320 among actions of the user 310 associated with the virtual space 320. The visual object 1030 may correspond to multimedia content representing an action accessing the store 350 among actions of the user 310 associated with the virtual space 320.

Referring to FIG. 10, the electronic device 302 may display at least one of a thumbnail 1022 of multimedia content corresponding to the visual object 1020, a text 1024 associated with the multimedia content, or an icon 1026 for executing a function to share the multimedia content, in the visual object 1020. In response to an input indicating to select the visual object 1020, the electronic device 302 may display multimedia content corresponding to the visual object 1020 in the display 420. In response to an input indicating to select the icon 1026 in the visual object 1020, the electronic device 302 may execute a function to share multimedia content corresponding to the visual object 1020 with another application different from the second application corresponding to the screen 1010 and/or another electronic device (e.g., the HMD 510 and/or a terminal owned by another user different from the user 310) different from the electronic device 302.

In an embodiment, layout of the visual objects 1020 and 1030 may depend on an attribute of multimedia content corresponding to each of the visual objects 1020 and 1030. Referring to FIG. 10, the multimedia content corresponding to the visual object 1030 may correspond to multimedia content representing an action of a user who accessed the store 350 in the virtual space 320. The electronic device 302 may display an icon 1036 for executing an application (e.g., application for providing the screen 703 of FIG. 7) matched to the store 350 associated with multimedia content corresponding to the visual object 1030 in the visual object 1030. In response to an input indicating to select the visual object 1030, the electronic device 302 may display multimedia content corresponding to the visual object 1030 in the display 420. In response to an input indicating to select the icon 1036, the electronic device 302 may switch the screen 1010 displayed in the display 420 to another screen provided from the application corresponding to the icon 1036, by executing the application corresponding to the icon 1036.

As described above, according to an embodiment, the electronic device 302 may obtain information associated with an action of the user 310 performed in the virtual space 320 by communicating with the external electronic device 304. As described above with reference to FIG. 5, since the user 310 communicates with the external electronic device 304 using one or more user terminals, the action of the user 310 performed in the virtual space 320 may be stored in the external electronic device 304 based on exchanging signals with the user terminals. The electronic device 302 may store the information as a state processible by the second application different from the first application installed in the electronic device 302 for accessing the virtual space 320. As described above with reference to FIGS. 6 and 7, the information may include a push message for executing the second application. The information may include at least one multimedia content obtained by the user 310 in the virtual space 320, such as the second multimedia content 840 of FIGS. 8 and 9. As described above with reference to FIG. 10, the information may include at least one multimedia content representing an action of the user 310 performed in the virtual space 320.

Hereinafter, example operations of the electronic device 302 and the external electronic device 304 according to an embodiment will be described in greater detail below with reference to FIGS. 11, 12 and 13.

Figure 11:
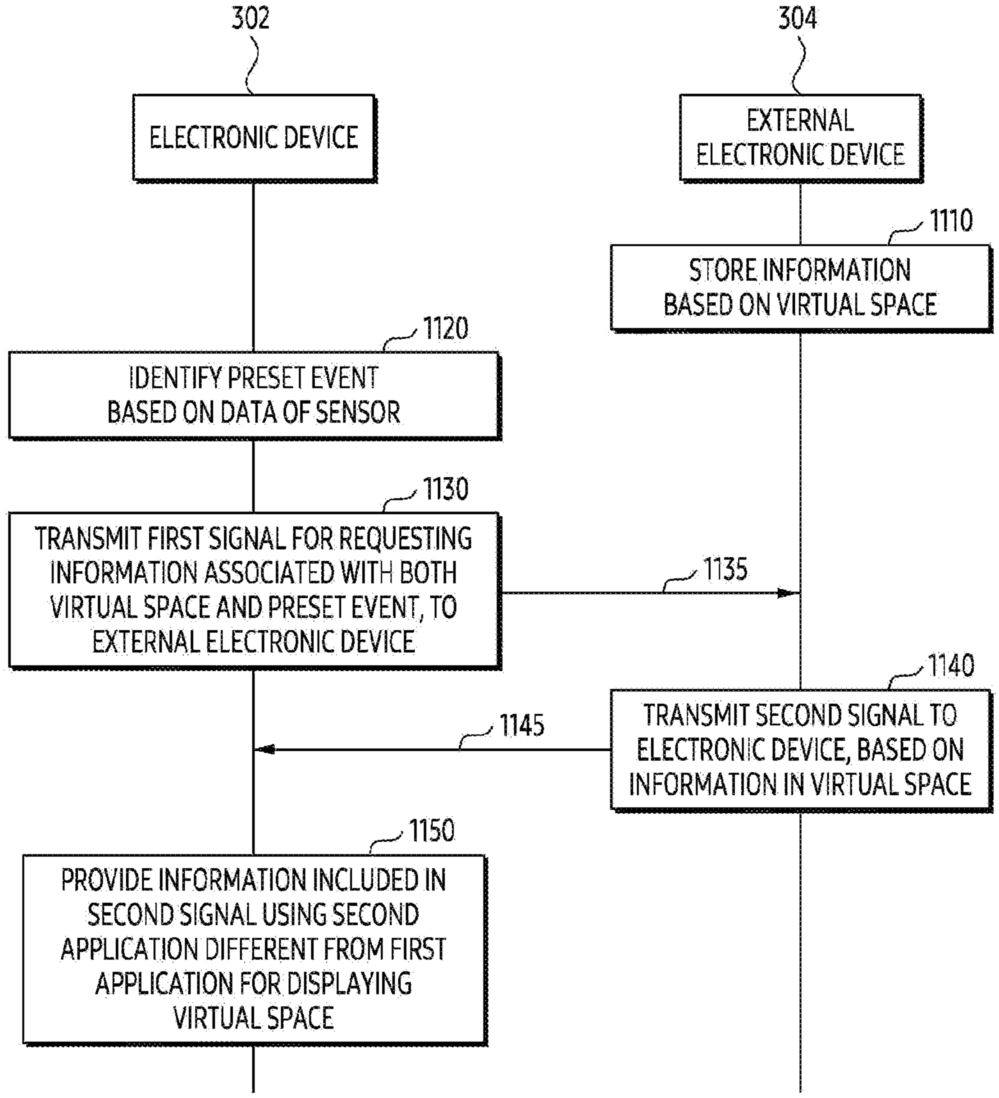
FIG. 11 is a signal flow diagram illustrating an example operation between an electronic device and an external electronic device, according to an embodiment.

FIG. 11 is a signal flow diagram illustrating operations between an electronic device 302 and an external electronic device 304, according to an embodiment. The electronic device 302 and the external electronic device 304 of FIGS. 3 and 4 may be an example of the electronic device 302 and the external electronic device 304 of FIG. 11. Operations 1110 and 1140 of FIG. 11 may be performed by the external electronic device 304 of FIG. 4 and the processor 410-2 in the external electronic device 304. Operations 1120, 1130, and 1150 of FIG. 11 may be performed by the electronic device 302 and the processor 410-1 of the electronic device 302 of FIG. 4.

Referring to FIG. 11, according to an embodiment, in operation 1110, the external electronic device 304 may store information based on a virtual space (e.g., the virtual space 320 of FIG. 3, FIGS. 5 to 6, FIG. 8, and/or FIG. 10). The information may be stored in the user profile 455 and/or the position profile 460 of FIG. 4. The external electronic device 304 may store the information indicating the virtual space modified by a signal, based on identifying the signal for controlling the virtual space from the electronic device 302. The signal may include information for indicating an input to control the virtual space and/or an avatar (e.g., the avatar 330 of FIGS. 3, 5 to 6, 8, and/or 10) included in the virtual space identified by the electronic device 302. The external electronic device 304 may perform operation 1110 based on the above-described operation with reference to FIG. 5.

Referring to FIG. 11, according to an embodiment, in operation 1120, the electronic device 302 may identify a preset event based on data of a sensor (e.g., the sensor 430 of FIG. 4). The preset event may occur by being moved the position of the electronic device 302 to a place (e.g., the place 610 of FIG. 6) in a real space linked to the virtual space. The preset event may occur by obtaining multimedia content (e.g., the first multimedia content 810 of FIG. 8) including a real space by the electronic device 302.

According to an embodiment, in operation 1130, the electronic device 302 may transmit a first signal 1135 for requesting information associated with both the virtual space and the preset event to the external electronic device 304, based on identifying the preset event. The first signal 1135 may include information indicating the preset event. For example, the first signal 1135 may include information on at least one of a position of the electronic device 302, a position of the real space including the electronic device 302, or multimedia content obtained by the electronic device 302.

According to an embodiment, in operation 1140, the external electronic device 304 may transmit the second signal 1145 to the electronic device 302 based on information in the virtual space, in response to receiving the first signal 1135. The second signal 1145 may include information associated with both the preset event and the virtual space of operation 1120. Information included in the second signal 1145 may include information associated with a portion (e.g., the store 350 of FIG. 3, FIG. 6, and/or FIG. 10) of a virtual space linked to the position of the electronic device 302 in which the preset event has occurred. The information included in the second signal 1145 may include a push message associated with an application (e.g., the second application 445 of FIG. 4) linked to the position of the electronic device 302 in which the preset event has occurred. The information included in the second signal 1145 may include the second multimedia content (e.g., the second multimedia content 840 of FIG. 8) associated with the first multimedia content (e.g., the first multimedia content 810 of FIG. 8) corresponding to the preset event.

According to an embodiment, in operation 1150, the electronic device 302 may provide information included in the second signal 1145 using the second application different from the first application for displaying the virtual space, based on receiving the second signal 1145. For example, the electronic device 302 may display a visual object (e.g., the visual objects 710 and 724 of FIG. 7) for executing the second application corresponding to the information included in the second signal 1145. In response to an input indicating to select the visual object, the electronic device 302 may display a screen (e.g., the screen 703 of FIG. 7) including the information, by executing the second application. For example, the electronic device 302 may store multimedia content (e.g., the second multimedia content 840 of FIG. 8) identified by the information included in the second signal 1145 in the electronic device 302, in a state executable by the second application. The second application may be an application different from the first application dedicated to access the virtual space, and may include an application for browsing multimedia content stored in the electronic device 302 such as the gallery application and/or an application linked to a place in the real space.

Figure 12:
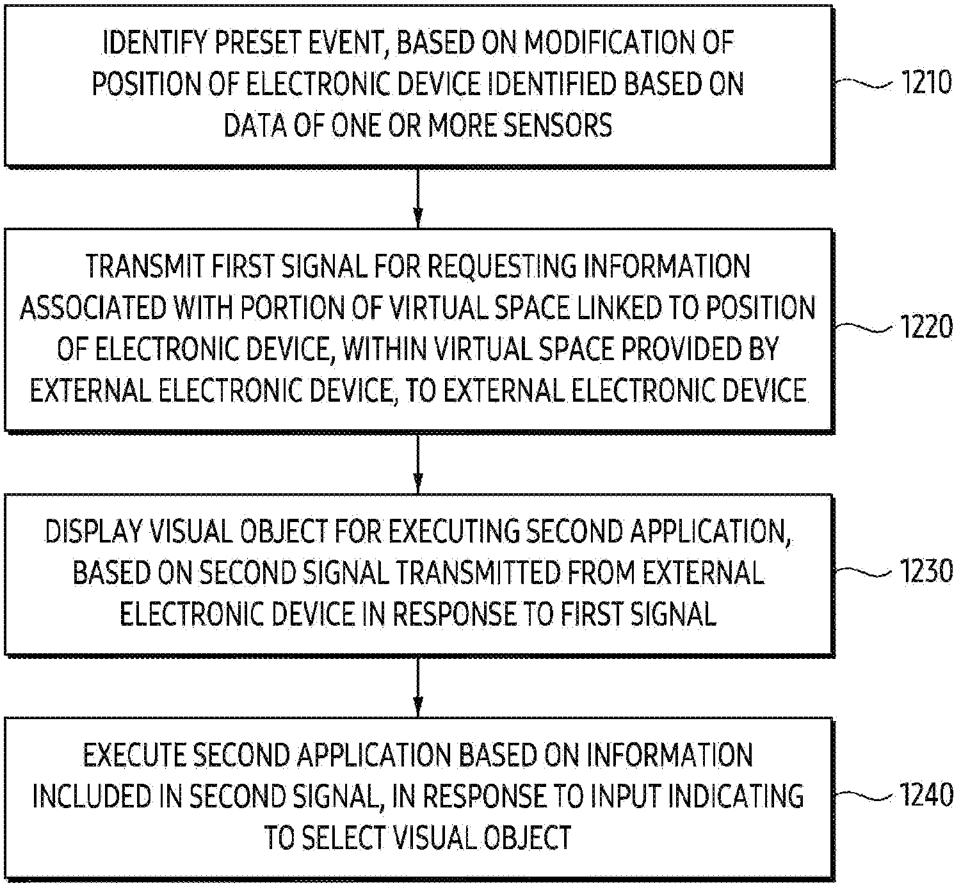
FIG. 12 is a flowchart illustrating an example operation of an electronic device, according to an embodiment.

FIG. 12 is a flowchart illustrating an example operation of an electronic device, according to an embodiment. The electronic device 302 of FIG. 3 may include the electronic device of FIG. 12. The operation of the electronic device of FIG. 12 may be performed by the electronic device 302 and/or the processor 410-1 in the electronic device 302 of FIG. 3. At least one of the operations of FIG. 12 may be associated with at least one of the operations of the electronic device 302 of FIG. 11.

Referring to FIG. 12, according to an embodiment, in operation 1210, the electronic device may identify a preset event, based on a modification of a position of the electronic device identified based on data of one or more sensors (e.g., the sensor 430 of FIG. 4). The preset event may occur, in order to request information associated with a virtual space provided by an external electronic device, to the external electronic device (e.g., the external electronic device 304 of FIG. 4) connected to the electronic device. For example, as described above with reference to FIGS. 6 to 7, the preset event may include an event in which the electronic device is moved to a place (e.g., the place 610 of FIG. 6) in a real space linked to at least a portion of the virtual space. The operation 1210 of FIG. 12 may be associated with the operation 1120 of FIG. 11.

Referring to FIG. 12, according to an embodiment, in operation 1220, the electronic device may transmit a first signal for requesting information associated with a portion of the virtual space linked to the position of the electronic device, within the virtual space provided by the external electronic device, to the external electronic device. The first signal may include the first signal 1135 of FIG. 11. When the preset event of operation 1210 has occurred by an electronic device moved to a place in a real space linked to a virtual space, the electronic device may transmit the first signal for requesting information associated with a position of the electronic device and/or a portion of the virtual space associated with the place, to the external electronic device. The operation 1220 of FIG. 12 may be associated with the operation 1130 of FIG. 11.

Referring to FIG. 12, according to an embodiment, in operation 1230, the electronic device may display a visual object for executing the second application, based on the second signal transmitted from the external electronic device in response to the first signal. The visual object of FIG. 12 may be displayed in a display (e.g., the display 420 of FIG. 4) of the electronic device to guide execution of the second application, such as the visual object 710 and/or the screen 702 of FIG. 7. The electronic device may display at least a portion of information included in the second signal in the visual object.

Referring to FIG. 12, according to an embodiment, in operation 1240, the electronic device may execute the second application based on information included in the second signal, in response to an input indicating to select the visual object. Based on execution of the second application, the electronic device may display a screen (e.g., the screen 703 of FIG. 7) provided from the second application in a display. Since the electronic device executes the second application based on the information included in the second signal, the electronic device may visualize at least a portion of the information (e.g., a QR code included in the screen 703 of FIG. 7), in the screen displayed within the display of the electronic device based on operation 1240. The operations 1230 and 1240 of FIG. 12 may be associated with the operation 1150 of FIG. 11.

Figure 13:
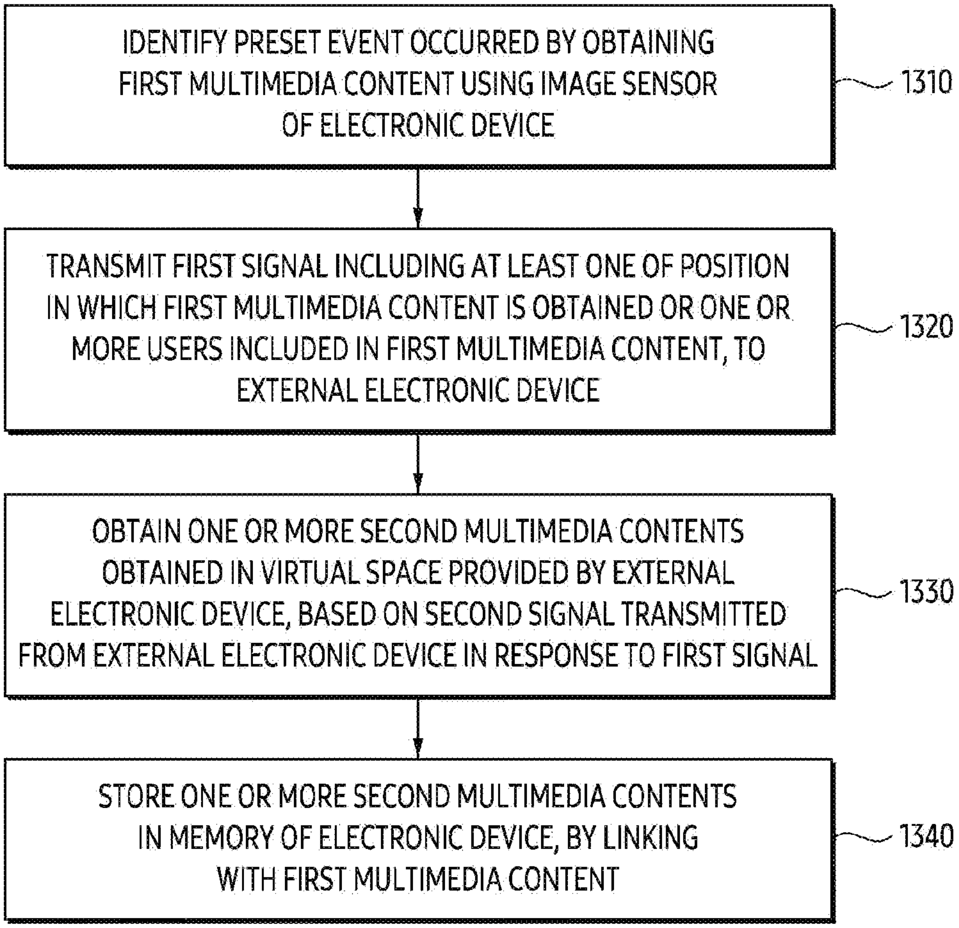
FIG. 13 is a flowchart illustrating an example operation of an electronic device, according to an embodiment.

FIG. 13 is a flowchart illustrating an example operation of an electronic device, according to an embodiment. The electronic device 302 of FIG. 3 may include the electronic device of FIG. 13. The operation of the electronic device of FIG. 13 may be performed by the electronic device 302 and/or the processor 410-1 in the electronic device 302 of FIG. 3. At least one of the operations of FIG. 13 may be associated with at least one of the operations of the electronic device 302 of FIG. 11.

Referring to FIG. 13, according to an embodiment, in operation 1310, the electronic device may identify that a preset event occurred by obtaining first multimedia content (e.g., the first multimedia content 810 of FIG. 8) using an image sensor (e.g., the camera 425 of FIG. 4) of the electronic device. The operation 1310 of FIG. 13 may be associated with the operation 1120 of FIG. 11.

Referring to FIG. 13, according to an embodiment, in operation 1320, the electronic device may transmit a first signal including at least one of a position in which the first multimedia content is obtained or one or more users included in the first multimedia content, to an external electronic device (e.g., the external electronic device 304 of FIGS. 3 to 4). The electronic device may transmit the first signal including the first multimedia content and/or metadata corresponding to the first multimedia content to the external electronic device. The first signal may include the first signal 1135 of FIG. 11. The operation 1320 of FIG. 13 may be associated with the operation 1130 of FIG. 11. The first signal may be transmitted from the electronic device to the external electronic device, in order to request search and/or transmission of at least one multimedia content linkable to the first multimedia content, among multimedia content stored in the external electronic device. The multimedia content stored in the external electronic device may include an image and/or video representing at least a portion of the virtual space provided by the external electronic device.

Referring to FIG. 13, according to an embodiment, in operation 1330, the electronic device may obtain one or more second multimedia contents (e.g., the second multimedia content 840 of FIG. 8) obtained in the virtual space provided by the external electronic device, based on the second signal transmitted from the external electronic device in response to the first signal.

Referring to FIG. 13, according to an embodiment, in operation 1340, the electronic device may store one or more second multimedia contents in the memory of the electronic device, by linking with the first multimedia content. Being stored one or more second multimedia contents by linking with the first multimedia content may include being stored another multimedia content obtained by synthesizing the first multimedia content and the one or more second multimedia contents in the electronic device. Since one or more second multimedia contents are stored by linking with the first multimedia content, the electronic device may continuously display another multimedia content different from the multimedia content displayed on the display among the first multimedia content and the one or more second multimedia content, in a state in which any one of the first multimedia content and the one or more second multimedia content is displayed on the display of the electronic device. The operations 1330 and 1340 of FIG. 13 may be related to the operation 1150 of FIG. 11.

As described above, according to an embodiment, the electronic device may obtain information associated with a virtual space provided by the external electronic device from the external electronic device. The electronic device may obtain information associated with the virtual space based on an event detected by the electronic device. The event may include a state suitable for providing a user experience linked to the virtual space, such as an event moved to a place in the virtual space linked to the virtual space. The information obtained by the electronic device from the external electronic device may include the second multimedia content associated with the virtual space, linked to the first multimedia content obtained from the real space.

A method of providing information generated by interaction between a virtual space and a user based on an event occurred in the real space through an electronic device may be required. As described above, according to an example embodiment, an electronic device (e.g., the electronic device 302 of FIG. 3 to FIG. 11) may include: a communication circuit (e.g., the communication circuit 435-1 of FIG. 4), one or more sensors (e.g., the sensor 430 of FIG. 4), a display (e.g., the display 420 of FIG. 4), and a processor (e.g., the processor 410-1 of FIG. 4). The processor may be configured to identify a specified event based on data output from the one or more sensors. The processor may be configured to, in response to identifying occurrence of the specified event, transmit, to an external electronic device (e.g., the external electronic devices 304 of FIGS. 3 to 6, 8, and/or 10 to 11) connected via the communication circuit, a first signal (e.g., the first signal 1135 of FIG. 11) for requesting information associated with both the specified event and a virtual space (e.g., the virtual space 320 of FIGS. 3, 5 to 6, FIG. 8, and/or FIG. 10) provided by the external electronic device. The processor may be configured to provide, by controlling the display based on receiving a second signal (e.g., the second signal 1145 of FIG. 11) corresponding to the first signal from the external electronic device, information included in the second signal in a state executable by a second application (e.g., the second application 445 of FIG. 4) different from the first application (e.g., the first application 440 of FIG. 4) for displaying the virtual space. According to an example embodiment, the electronic device may obtain information on the virtual space associated with the event based on an event occurred in the real space.

For example, the processor may be configured to identify, based on modification of a position of the electronic device indicated by the data, whether the specified event occurred. The processor may be configured to transmit, via the communication circuit, the first signal for requesting the information associated with at least portion of the virtual space linked to the modified position, to the external electronic device, based on identifying that the specified event occurred.

For example, the processor may be configured to display a visual object (e.g., the visual object 710 of FIG. 7) for executing the second application, in the display, based on receiving the second signal. The visual object may be associated with the modified position and is corresponding to a push message included in the second signal.

For example, the processor may be configured to execute, in response to an input indicating to select the visual object, the second application. The processor may be configured to display a screen (e.g., screen 703 of FIG. 7) provided from the second application and including at least portion of the information included in the second signal, in the display.

For example, the one or more sensors may include an image sensor. The processor may be configured to transmit, via the communication circuit, the first signal for requesting at least one second multimedia content (e.g., the second multimedia content 840 of FIGS. 8 to 9) associated with the first multimedia content and obtained in the virtual space, to the external electronic device, based on the specified event occurring by obtaining first multimedia content (e.g., the first multimedia content 810 of FIGS. 8 to 9) using the image sensor.

For example, the processor may be configured to transmit, via the communication circuit, the first signal including metadata corresponding to the first multimedia content to the external electronic device. The metadata may include data for identifying a position where the first multimedia content is obtained or one or more users included in the first multimedia content.

For example, the processor may be configured to, in response to an input indicating to execute the second application, display a screen provided by the second application in the display. The processor may be configured to control the display to display a visual object (e.g., the visual object 914 of FIG. 9) matched to a group of the first multimedia content and the at least one second multimedia content and identified by the information, in the screen.

For example, the electronic device may further include a memory (e.g., the memory 415-1 of FIG. 4). The processor may be configured to store the first multimedia content representing interaction between the virtual space and the electronic device and included in the second signal received from the external electronic device, in a state that the first multimedia content is browsable by the second application for browsing the one or more second multimedia contents stored in the memory.

As described above, according to an example embodiment, a method of an electronic device (e.g., the external electronic device 304 of FIGS. 3 to 6, 8, and/or 10 to 11) may comprise receiving, from an external electronic device via a communication circuit in the electronic device, a first signal for requesting information associated with virtual space provided by the electronic device. The method may comprise obtaining, based on a specified event identified by the external electronic device and indicated by the first signal, information associated with both the virtual space and the specified event. The method may comprise transmitting, to the external electronic device, a second signal for providing the obtained information using a second application different from the first application associated with the virtual space.

For example, the obtaining may comprise identifying, based on the first signal, a position of the external electronic device where the specified event occurred. The obtaining may comprise obtaining, based on at least portion of the virtual space linked to the identified position, the information.

For example, the transmitting may comprise transmitting the second signal including a push message for executing the second application to the external electronic device.

For example, the obtaining may comprise, based on receiving the first signal including first multimedia content obtained by the external electronic device, identifying at least one of a position where the first multimedia content is obtained or at least one user included in the first multimedia content. The obtaining may comprise obtaining, based on at least one avatar corresponding to the at least one user in the virtual space or a portion of the virtual space linked to the position, at least one second multimedia content associated with the first multimedia content.

For example, the transmitting may comprise transmitting the second signal including the at least one second multimedia content to the external electronic device.

For example, the obtaining may comprise, based on metadata corresponding to the first multimedia content and included in the first signal, identifying at least one of the position where the first multimedia content is obtained or at least one user.

For example, the transmitting may comprise identifying first multimedia content representing interaction between a user, identified by the first signal and logged in the external electronic device, and the virtual space. The transmitting may comprise transmitting the second signal including the first multimedia content in a state browsable by the second application for browsing the one or more second multimedia contents stored in a memory of the external electronic device, to the external electronic device.

As described above, according to an example embodiment, a method of an electronic device may comprise identifying (e.g., operation 1120 of FIG. 11) a specified event based on data output from one or more sensors in the electronic device. The method may comprise, in response to identifying occurrence of the specified event, transmitting (e.g., operation 1130 of FIG. 11), to an external electronic device connected via a communication circuit in the electronic device, a first signal for requesting information associated with both the specified event and a virtual space provided by the external electronic device. The method may comprise providing (e.g., operation 1150 of FIG. 11), by controlling a display in the electronic device based on receiving a second signal corresponding to the first signal from the external electronic device, information included in the second signal in a state executable by a second application different from the first application for displaying the virtual space.

For example, the transmitting may comprise identifying, based on modification of a position of the electronic device indicated by the data, whether the specified event occurred. The transmitting may comprise, based on identifying that the specified event occurred, transmitting, to the external electronic device, the first signal for requesting the information associated with at least portion of the virtual space linked to the modified position.

For example, the providing may comprise based on receiving the second signal, displaying a visual object for executing the second application, in the display. The visual object may be associated with the modified position and may correspond to a push message included in the second signal.

For example, the providing may comprise executing, in response to an input indicating to select the visual object, the second application. The providing may comprise displaying a screen provided from the second application, and including at least portion of the information included in the second signal, in the display.

For example, the transmitting may comprise, based on the specified event occurring by obtaining first multimedia content using an image sensor in the electronic device, transmitting the first signal for requesting at least one second multimedia content associated with the first multimedia content and obtained in the virtual space, to the external electronic device.

For example, the transmitting may comprise transmitting the first signal including metadata corresponding to the first multimedia content to the external electronic device. The metadata may include data for identifying a position where the first multimedia content is obtained or one or more users included in the first multimedia content.

For example, the displaying may comprise, in response to an input indicating to execute the second application, displaying a screen provided by the second application in the display. The displaying may comprise displaying a visual object matched to a group of the first multimedia content and the at least one second multimedia content and identified by the information, in the screen.

As described above, according to an example embodiment, an electronic device (e.g., the external electronic devices 304 of FIGS. 3 to 6, 8, and/or 10 to 11) may include: a communication circuit (e.g., the communication circuit 435-2 of FIG. 4) and a processor (e.g., the processor 410-2 of FIG. 4). The processor may be configured to receive, from an external electronic device (e.g., the electronic device 302 of FIG. 3 to FIG. 11) via the communication circuit in the electronic device, a first signal (e.g., the first signal 1135 of FIG. 11) for requesting information associated with virtual space (e.g., the virtual space 320 of FIGS. 3, 5 to 6, 8, and/or 10) provided by the electronic device. The processor may be configured to obtain, based on a specified event identified by the external electronic device and indicated by the first signal, information associated with both the virtual space and the specified event. The processor may be configured to transmit, to the external electronic device, via the communication circuit, a second signal (e.g., the second signal 1145 of FIG. 11) for providing the obtained information using a second application (e.g., the second application 445 of FIG. 4) different from the first application (e.g., the first application 440 of FIG. 4) associated with the virtual space.

For example, the processor may be configured to identify, based on the first signal, a position of the external electronic device where the specified event occurred. The processor may be configured to obtain, based on at least portion of the virtual space linked to the identified position, the information.

For example, the processor may be configured to transmit, via the communication circuit, the second signal including a push message for executing the second application to the external electronic device.

For example, the processor may be configured to identify at least one of a position where the first multimedia content (e.g., the first multimedia content 810 of FIGS. 8 to 9) is obtained or at least one user included in the first multimedia content, based on receiving the first signal including first multimedia content obtained by the external electronic device. The processor may be configured to obtain, based on at least one avatar corresponding to the at least one user in the virtual space or a portion of the virtual space linked to the position, at least one second multimedia content (e.g., the second multimedia content 840 of FIGS. 8 to 9) associated with the first multimedia content.

For example, the processor may be configured to transmit, via the communication circuit, the second signal including the at least one second multimedia content to the external electronic device.

For example, the processor may be configured to identify at least one of the position where the first multimedia content is obtained or at least one user, based on metadata corresponding to the first multimedia content and included in the first signal.

For example, the processor may be configured to identify first multimedia content representing interaction between a user (e.g., the users 310 in FIGS. 3, 5, 8, and/or 10), identified by the first signal and logged in the external electronic device, and the virtual space. The processor may be configured to transmit the second signal including the first multimedia content in a state browsable by the second application for browsing the one or more second multimedia contents stored in a memory of the external electronic device, to the external electronic device.

The apparatus described above may be implemented as a combination of hardware components, software components, and/or hardware components and software components. For example, the devices and components described in the embodiments may be implemented using one or more general purpose computers or special purpose computers such as processors, controllers, arithmetical logic unit (ALU), digital signal processor, microcomputers, field programmable gate array (FPGA), PLU (programmable logic unit), microprocessor, any other device capable of executing and responding to instructions. The processing device may perform an operating system OS and one or more software applications performed on the operating system. In addition, the processing device may access, store, manipulate, process, and generate data in response to execution of the software. For convenience of understanding, although one processing device may be described as being used, a person skilled in the art may see that the processing device may include a plurality of processing elements and/or a plurality of types of processing elements. For example, the processing device may include a plurality of processors or one processor and one controller. In addition, other processing configurations, such as a parallel processor, are also possible.

The software may include a computer program, code, instruction, or a combination of one or more of them and configure the processing device to operate as desired or command the processing device independently or in combination. Software and/or data may be embodied in any type of machine, component, physical device, computer storage medium, or device to be interpreted by a processing device or to provide instructions or data to the processing device. The software may be distributed on a networked computer system and stored or executed in a distributed manner Software and data may be stored in one or more computer-readable recording media.

The method according to the embodiment may be implemented in the form of program instructions that may be performed through various computer means and recorded in a computer-readable medium. In this case, the medium may continuously store a computer-executable program or temporarily store the program for execution or download. In addition, the medium may be a variety of recording means or storage means in which a single or several hardware are combined and is not limited to media directly connected to any computer system and may be distributed on the network. Examples of media may include magnetic media such as hard disks, floppy disks and magnetic tapes, optical recording media such as CD-ROMs and DVDs, magneto-optical media such as floppy disks, ROMs, RAMs, flash memories, and the like to store program instructions. Examples of other media include app stores that distribute applications, sites that supply or distribute various software, and recording media or storage media managed by servers.

Although embodiments have been described according to various example embodiments and drawings as above, various modifications and modifications are possible from the above description to those of ordinary skill in the art. For example, even if the described techniques are performed in a different order from the described method, and/or components such as the described system, structure, device, circuit, etc. are combined or combined in a different form from the described method or are substituted or substituted by other components or equivalents, appropriate results may be achieved.

Therefore, other implementations, other embodiments, and equivalents to the claims fall within the scope of the appended claims.

In other words, while the disclosure has been illustrated and described with reference to various example embodiments, it will be understood that the various example embodiments are intended to be illustrative, not limiting. It will be further understood by those skilled in the art that various changes in form and detail may be made without departing from full scope of the disclosure, including the appended claims and their equivalents. It will also be understood that any of the embodiment(s) described herein may be used in conjunction with any other embodiment(s) described herein.

What is claimed is:

1. An electronic device, comprising:
a communication circuit;
one or more sensors;
a display; and
at least one processor comprising processing circuitry; and
memory comprising one or more storage media storing instructions to, when executed by the at least one processor, cause the electronic device to:
identify, via the one or more sensors, whether the electronic device is positioned at a place corresponding to a region of interest (ROI) of a user of the electronic device in a physical environment, the ROI being defined in a virtual environment;
based on the electronic device being identified as positioned at the place in the physical environment via the one or more sensors, transmit, via the communication circuit, to an external electronic device providing a service associated with the virtual environment, a first signal indicating that the electronic device is positioned at the place in the physical environment;
receive, via the communication circuit, a second signal transmitted from the external electronic device in response to the first signal; and
based on the second signal, display, via the display, information regarding past activity history that was performed in the virtual environment with respect to the ROI.

2. The electronic device of claim 1,
wherein the place corresponding to the ROI in the physical environment is linked to a virtual store in the virtual environment.

3. The electronic device of claim 1,
wherein the information regarding the past activity history includes information with respect to one or more items provided in the ROI.

4. The electronic device of claim 3, wherein the information with respect to the one or more items includes a coupon for the one or more items.

5. The electronic device of claim 1,
wherein the information regarding the past activity history includes content for guiding that the place is associated with the ROI.

6. The electronic device of claim 1,
wherein the information regarding the past activity history includes a visual object for executing an application program associated with at least one of the place or the ROI, and
wherein the application program is different from another application program for providing the virtual environment.

7. An electronic device, comprising:
communication circuitry;
an image sensor;
a display;
at least one processor comprising processing circuitry; and
memory comprising one or more storage media storing instructions to, when executed by the at least one processor, cause the electronic device to:
obtain, via the image sensor, first multimedia content representing one or more users;
based on obtaining the first multimedia content, transmit, via the communication circuitry, to an external electronic device providing a service associated with a virtual environment of a metaverse, a first signal for requesting second multimedia content representing one or more avatars corresponding to the one or more users and at least a portion of the virtual environment of the metaverse, the second multimedia content obtained from the virtual environment of the metaverse;
receive, via the communication circuitry, a second signal transmitted from the external electronic device in response to the first signal; and
based on the second signal:
display, via the display, the second multimedia content, and
store, in the memory, the second multimedia content as associated with the first multimedia content.

8. The electronic device of claim 7, wherein the instructions, when executed by the at least one processor, cause the electronic device to:
based on obtaining the first multimedia content representing the one or more users, obtain metadata for identifying the one or more users, and
transmit, via the communication circuitry to the external electronic device, the first signal including the metadata, and
wherein the second multimedia content is identified using the metadata.

9. The electronic device of claim 7, wherein the instructions, when executed by the at least one processor, cause the electronic device to:
in response to an input to execute a first application program different from a second application program for displaying the virtual environment of the metaverse, display, via the display, a screen provided by the first application program; and
display, via the display, a visual object matched to a group of the first multimedia content and the second multimedia content.

10. The electronic device of claim 7,
wherein the second multimedia content is obtained from the virtual environment of the metaverse using an avatar corresponding to a user of the electronic device.

11. The electronic device of claim 7, wherein the instructions, when executed by the at least one processor, cause the electronic device to:

based on the receiving of the second signal, execute an application for browsing one or more multimedia contents stored in the memory; and display, via the display, the second multimedia content by executing the application.

12. The electronic device of claim 11, wherein the instructions, when executed by the at least one processor, cause the electronic device to:

display, via the display, the first multimedia content and the second multimedia content associated with each other, by executing the application.

13. The electronic device of claim 7, wherein the instructions, when executed by the at least one processor, cause the electronic device to:

generate third multimedia content by synthesizing the first multimedia content and the second multimedia content; and store, in the memory, the second multimedia content as associated with the first multimedia content by storing the third multimedia content in the memory.

14. A method performed by an electronic device with communication circuitry, one or more sensors, and a display, the method comprising:

identifying, via the one or more sensors, whether the electronic device is positioned at a place corresponding to a region of interest (ROI) of a user of the electronic device in a physical environment, the ROI being defined in a virtual environment;

based on the electronic device being identified as positioned at the place in the physical environment via the one or more sensors, transmitting, via the communication circuitry, to an external electronic device providing a service associated with the virtual environment, a first signal indicating that the electronic device is positioned at the place in the physical environment;

receiving, via the communication circuitry, a second signal transmitted from the external electronic device in response to the first signal; and based on the second signal, displaying, via the display, information regarding past activity history that was performed in the virtual environment with respect to the ROI.

15. The method of claim 14, wherein the place corresponding to the ROI in the physical environment is linked to a virtual store in the virtual environment.

16. The method of claim 14, wherein the information regarding the past activity history includes information with respect to one or more items provided in the ROI.

17. The method of claim 16, wherein the information with respect to the one or more items includes a coupon for the one or more items.

18. The method of claim 14, wherein the information regarding the past activity history includes content for guiding that the place is associated with the ROI.

19. The method of claim 14, wherein the information regarding the past activity history includes a visual object for executing an application program associated with at least one of the place or the ROI, and wherein the application program is different from another application program for providing the virtual environment.

* * * * *